United States Patent
Kalantari et al.

(10) Patent No.: US 10,499,025 B2
(45) Date of Patent: Dec. 3, 2019

(54) PROJECTING INTERACTIVE INFORMATION FROM INTERNALLY WITHIN A MANNEQUIN

(71) Applicant: Accenture Global Solutions Limited, Dublin (IE)

(72) Inventors: Roman Kalantari, Brooklyn, NY (US); John R. Jones, Hastings on Hudson, NY (US); Hunter Grove, Brooklyn, NY (US); Audrey Fox, Brooklyn, NY (US); Jane Lupica, Newton, PA (US)

(73) Assignee: Accenture Global Solutions Limited, Dublin (IE)

(*) Notice: Subject to any disclaimer, the term of this patent is extended or adjusted under 35 U.S.C. 154(b) by 0 days.

(21) Appl. No.: 16/153,171

(22) Filed: Oct. 5, 2018

(65) Prior Publication Data

US 2019/0110034 A1    Apr. 11, 2019

Related U.S. Application Data

(60) Provisional application No. 62/569,474, filed on Oct. 6, 2017.

(51) Int. Cl.
| | |
|---|---|
| *G03B 21/26* | (2006.01) |
| *H04N 9/31* | (2006.01) |
| *G03B 21/14* | (2006.01) |
| *H04N 5/272* | (2006.01) |
| *G03B 21/62* | (2014.01) |
| *G06F 3/01* | (2006.01) |

(52) U.S. Cl.
CPC ......... *H04N 9/3185* (2013.01); *G03B 21/145* (2013.01); *G03B 21/62* (2013.01); *H04N 5/272* (2013.01); *G06F 3/013* (2013.01); *H04N 2005/2726* (2013.01)

(58) Field of Classification Search
CPC ........ G03B 21/26; G03B 21/28; G03B 21/60; G03B 21/145; G03B 21/14; G03B 21/142; H04N 9/3141
See application file for complete search history.

(56) References Cited

U.S. PATENT DOCUMENTS 6,467,908 B1 * 10/2002 Mines .................... G09F 19/08
353/28

* cited by examiner

*Primary Examiner* — Ryan D Howard
(74) *Attorney, Agent, or Firm* — Harrity & Harrity, LLP

(57) ABSTRACT

A device receives information to be projected from within and onto a mannequin, and receives instructions associated with projection of the information from within and onto the mannequin. A mirror and a projector are provided within the mannequin, and the projector is in optical communication with the mirror. The device causes, based on the instructions, the mirror to be moved from a first location to a second location, the mirror to be rotated from a first position to a second position, the projector to be moved from a third location to a fourth location, or the projector to be rotated from a third position to a fourth position. The device provides the information to the projector, and causes the projector to provide the information at a portion of the mannequin via the mirror, wherein the information is projected from within and onto the mannequin at the portion.

20 Claims, 16 Drawing Sheets

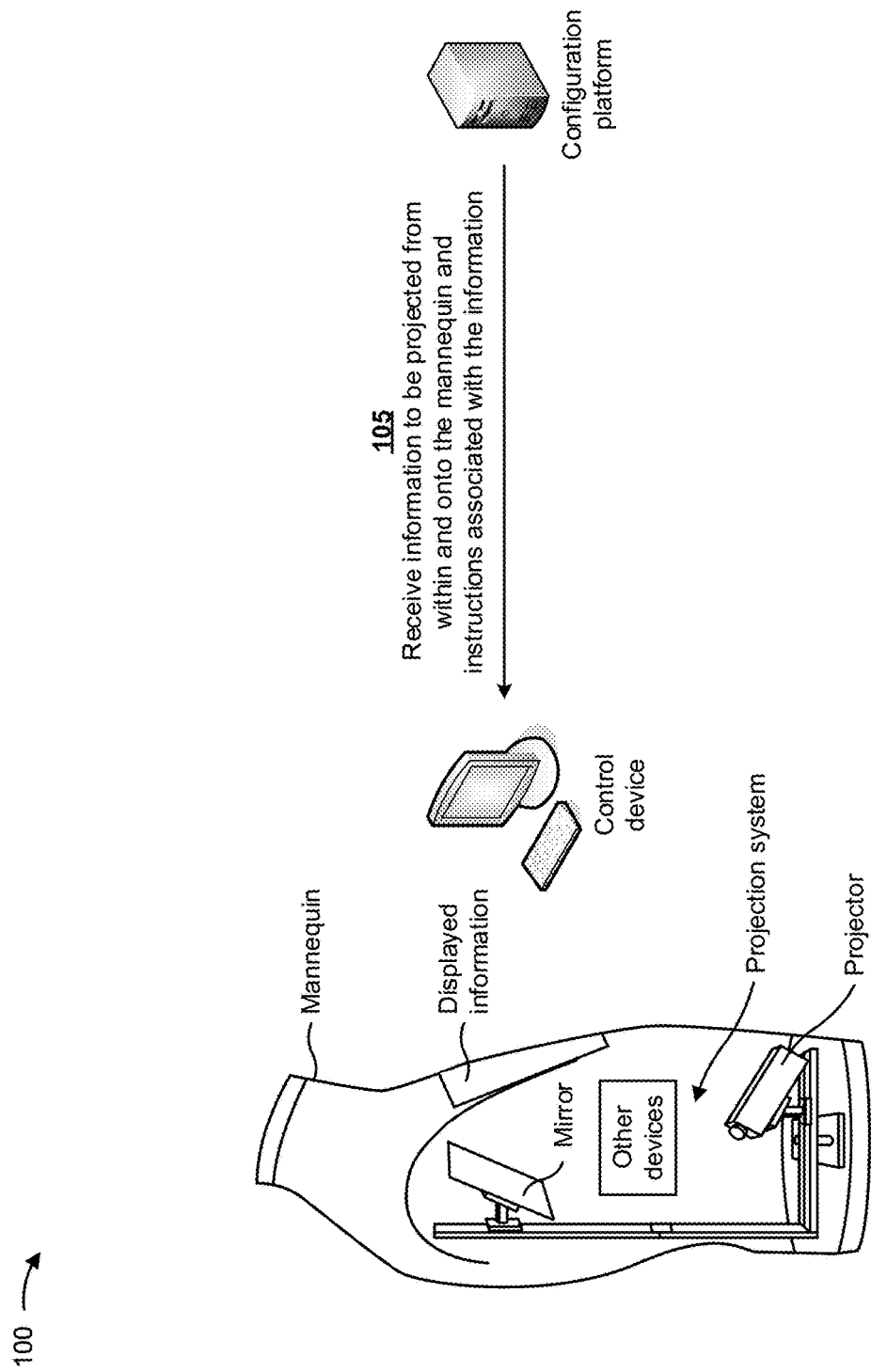

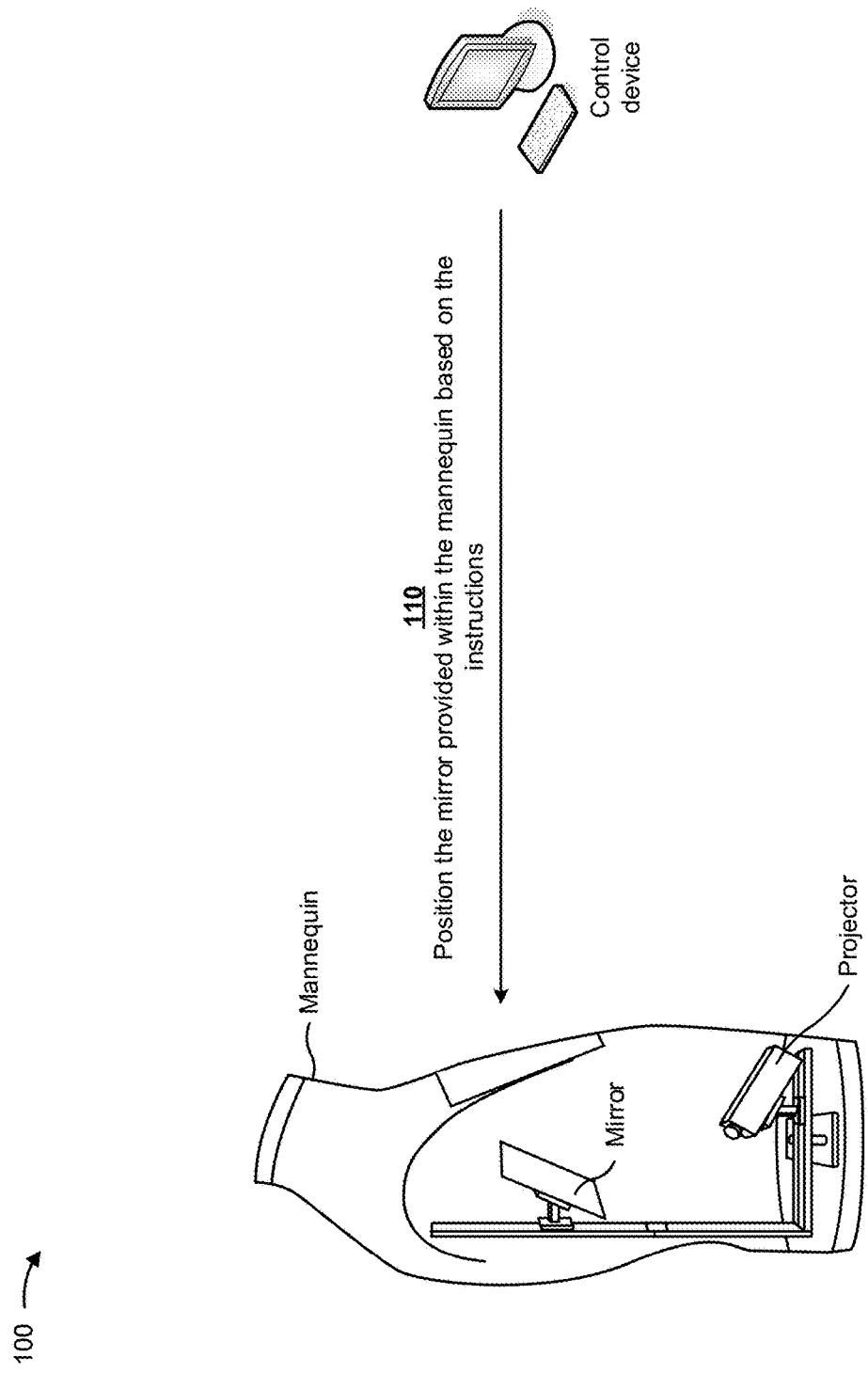

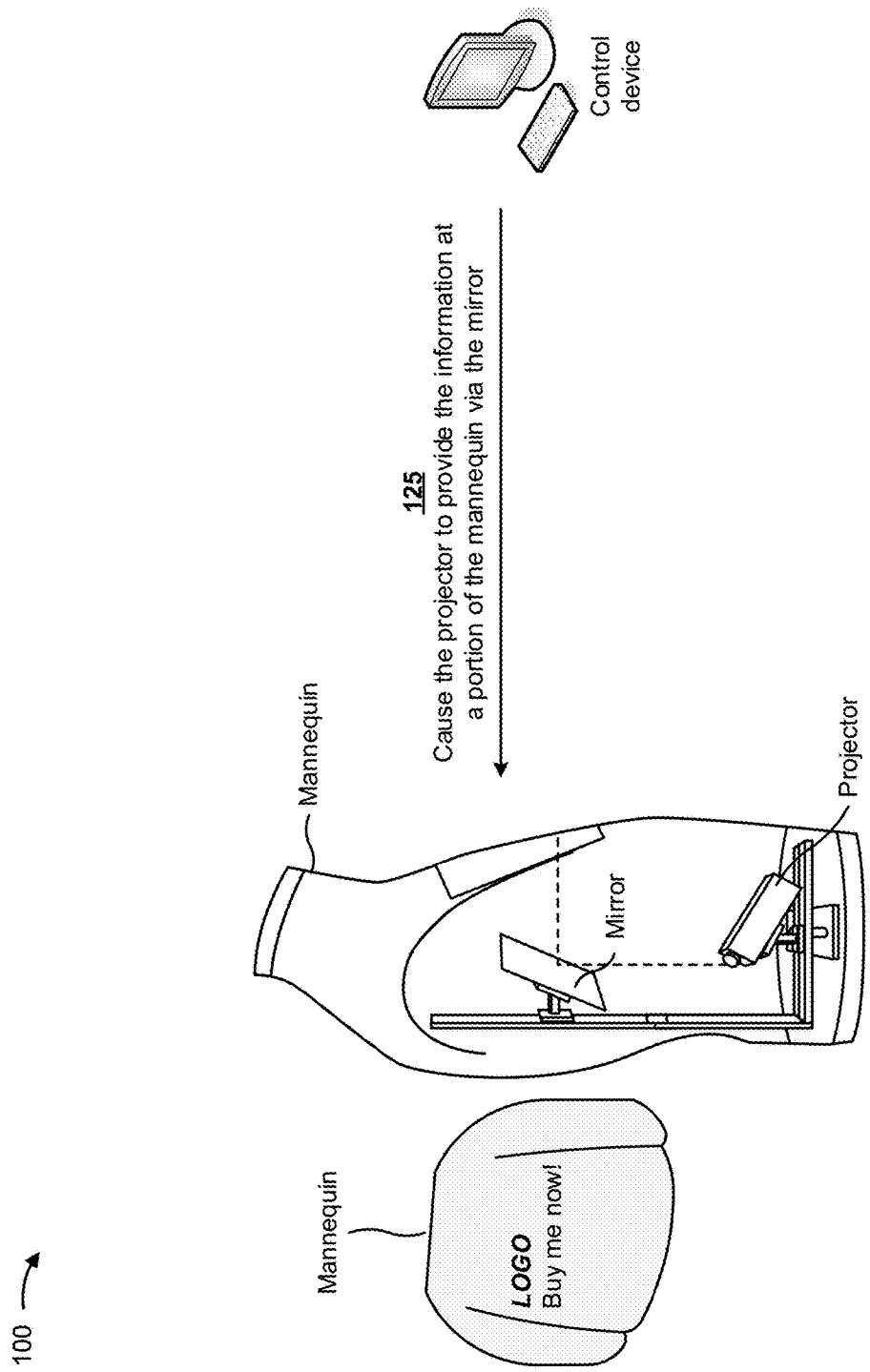

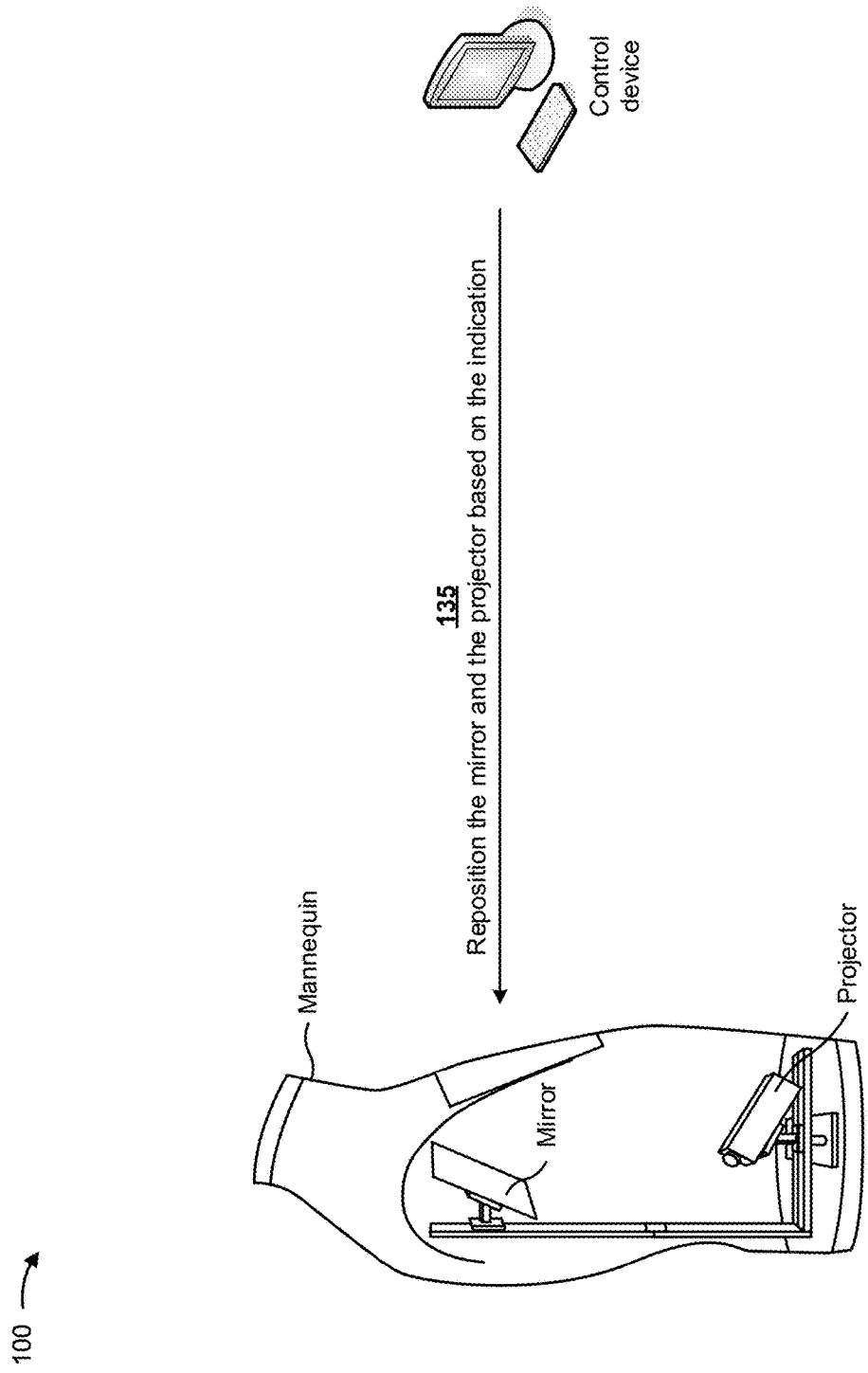

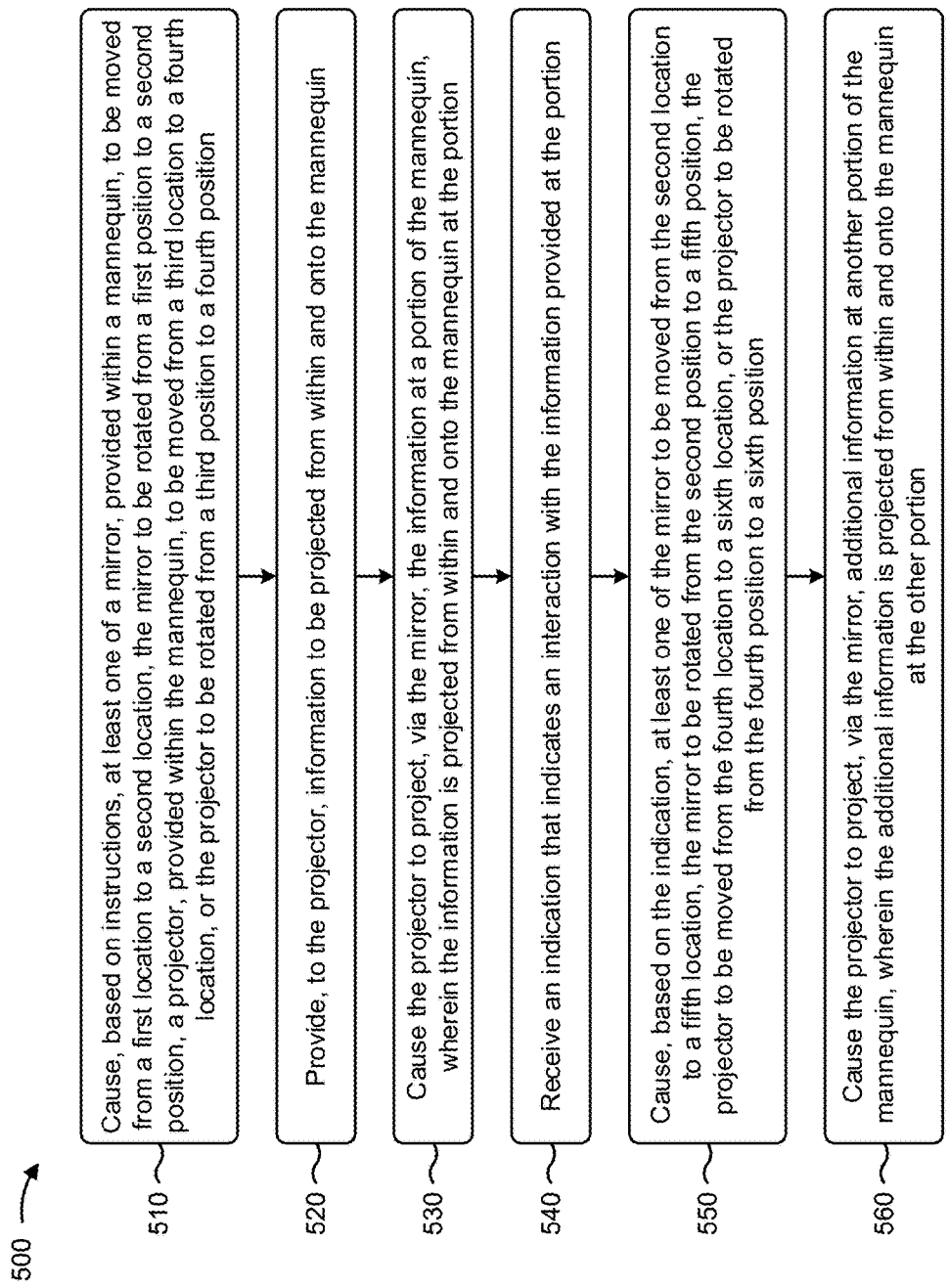

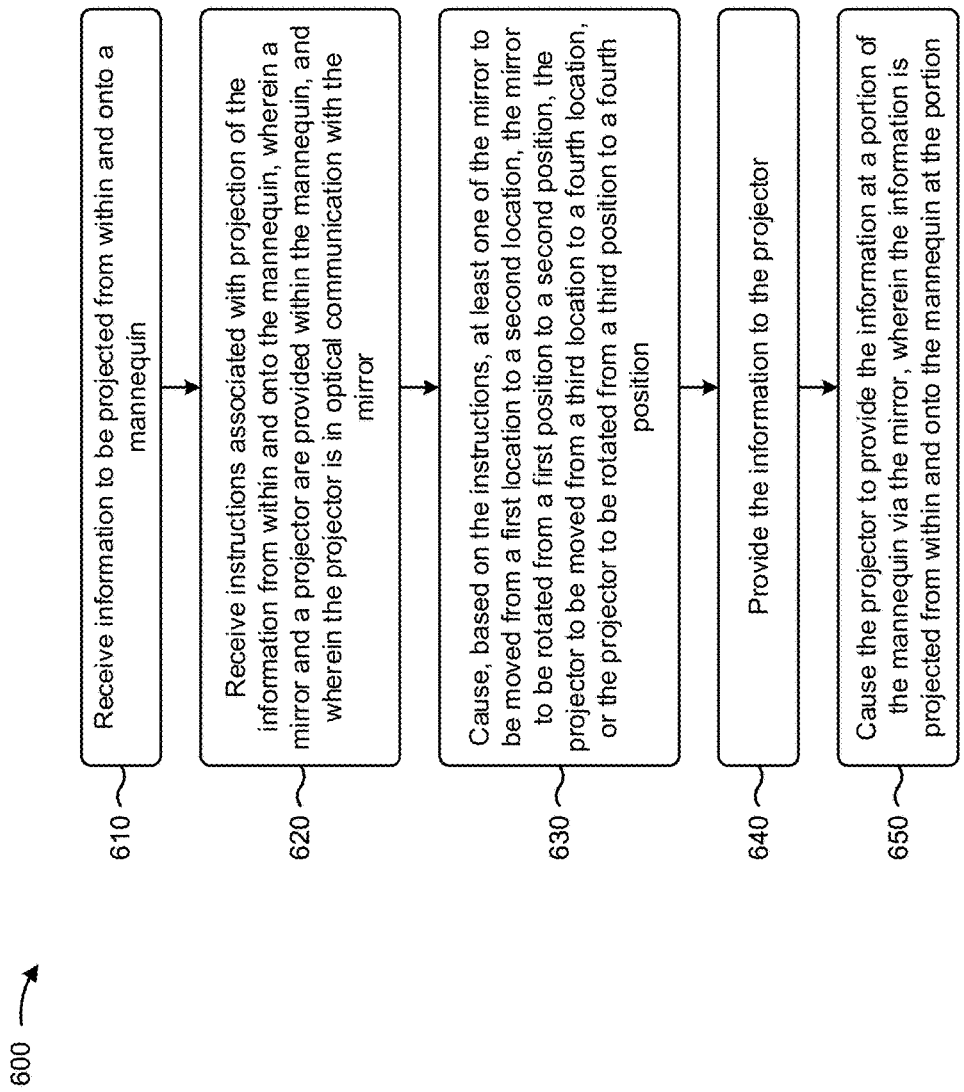

PROJECTING INTERACTIVE INFORMATION FROM INTERNALLY WITHIN A MANNEQUIN

RELATED APPLICATION

This application claims priority under 35 U.S.C. § 119 to U.S. Provisional Patent Application No. 62/569,474, filed on Oct. 6, 2017, the content of which is incorporated by reference herein in its entirety.

BACKGROUND

A mannequin (also called a manikin, a dummy, a lay figure, a dress form, and/or the like) is an articulated doll used by artists, tailors, dressmakers, window dressers, and others to display or fit clothing. A mannequin may also include a life-sized doll with a simulated airway used in the teaching of first aid, cardiopulmonary resuscitation (CPR), advanced airway management skills, such as tracheal intubation, and/or the like. A mannequin may further include a human figure used in computer simulation to model the behavior of the human body.

SUMMARY

According to some implementations, a method may include receiving information to be projected from within and onto a mannequin, and instructions associated with the information, and causing, based on the instructions, at least one of a mirror, provided within the mannequin, to be moved from a first location to a second location, the mirror to be rotated from a first position to a second position, a projector, provided within the mannequin, to be moved from a third location to a fourth location, or the projector to be rotated from a third position to a fourth position. The method may include providing the information to the projector, and causing the projector to provide the information at a portion of the mannequin via the mirror, wherein the information is projected from within and onto the mannequin at the portion. The method may include receiving an indication that indicates a user interaction with the information provided at the portion, and causing, based on the indication, at least one of the mirror to be moved from the second location to a fifth location, the mirror to be rotated from the second position to a fifth position, the projector to be moved from the fourth location to a sixth location, or the projector to be rotated from the fourth position to a sixth position. The method may include causing the projector to provide additional information at another portion of the mannequin via the mirror, wherein the additional information is projected from within and onto the mannequin at the other portion.

According to some implementations, a device may include a mirror provided within a mannequin, a projector provided within the mannequin, and one or more memories to store information to be projected from within and onto the mannequin, and instructions associated with the information. The device may include one or more processors, communicatively coupled to the one or more memories, to cause, based on the instructions, at least one of the mirror to be moved from a first location to a second location, the mirror to be rotated from a first position to a second position, the projector to be moved from a third location to a fourth location, or the projector to be rotated from a third position to a fourth position. The one or more processors may provide the information to the projector, and may cause the projector to project, via the mirror, the information at a portion of the mannequin, wherein the information is projected from within and onto the mannequin at the portion. The one or more processors may receive an indication that indicates an interaction with the information provided at the portion, and may cause, based on the indication, at least one of the mirror to be moved from the second location to a fifth location, the mirror to be rotated from the second position to a fifth position, the projector to be moved from the fourth location to a sixth location, or the projector to be rotated from the fourth position to a sixth position. The one or more processors may cause the projector to project, via the mirror, additional information at another portion of the mannequin, wherein the additional information is projected from within and onto the mannequin at the other portion.

According to some implementations, a non-transitory computer-readable medium may store instructions that include one or more instructions that, when executed by one or more processors of a device, cause the one or more processors to receive information to be projected from within and onto a mannequin, and receive instructions associated with projection of the information from within and onto the mannequin, wherein a mirror and a projector are provided within the mannequin, and wherein the projector is in optical communication with the mirror. The one or more instructions may cause the one or more processors to cause, based on the instructions, at least one of the mirror to be moved from a first location to a second location, the mirror to be rotated from a first position to a second position, the projector to be moved from a third location to a fourth location, or the projector to be rotated from a third position to a fourth position. The one or more instructions may cause the one or more processors to provide the information to the projector, and cause the projector to provide the information at a portion of the mannequin via the mirror, wherein the information is projected from within and onto the mannequin at the portion.

BRIEF DESCRIPTION OF THE DRAWINGS

FIGS. 1A-1K are diagrams of an example implementation described herein.

FIGS. 4-6 are flow charts of example processes for projecting interactive information from internally within a mannequin.

DETAILED DESCRIPTION

The following detailed description of example implementations refers to the accompanying drawings. The same reference numbers in different drawings may identify the same or similar elements.

Projection mapping, also known as video mapping and spatial augmented reality, is a projection technology used to turn objects, often irregularly shaped, into a display surface for video projection. Projection mapping may be used for projecting video onto a mannequin from outside the mannequin. However, projection mapping requires time consuming recalibration of a projection system (e.g., a projector, a computer, a power supply, a mounting system, and/or the like) whenever a mannequin is moved.

Some implementations described herein provide a control device for a projection system that projects interactive information from internally within a mannequin. For example, the control device may receive information to be projected from within and onto the mannequin and instructions associated with the information, and may position a mirror, of the projection system and provided within the mannequin, based on the instructions. The control device may position a projector, of the projection system and provided within the mannequin, based on the instructions, and may provide the information to the projector. The control device may cause the projector to provide the information at a portion of the mannequin via the mirror, and may receive an indication indicating a user interaction with the information provided at the portion. The control device may reposition the mirror and/or the projector based on the indication, and may cause the projector to provide additional information at another location of the mannequin via the mirror.

In this way, the control device and the projection system create a unique and attention getting experience, while hiding technology (e.g., the control device and the projection system) from an end user (e.g., a customer). This creates a more seamless and attractive offering for store designers and merchandisers who do not want wires, projectors, screens, and/or the like distracting from clothing and other products being displayed on mannequins. The projection system may be quickly positioned and calibrated to display information on the mannequin even when the mannequin is physically moved. The projection system also conserves resources (e.g., processing resources, memory resources, and/or the like) since the projection system is provided internally to the mannequin and need only be positioned and calibrated a single time to display the same information on the mannequin.

Figure 1B:
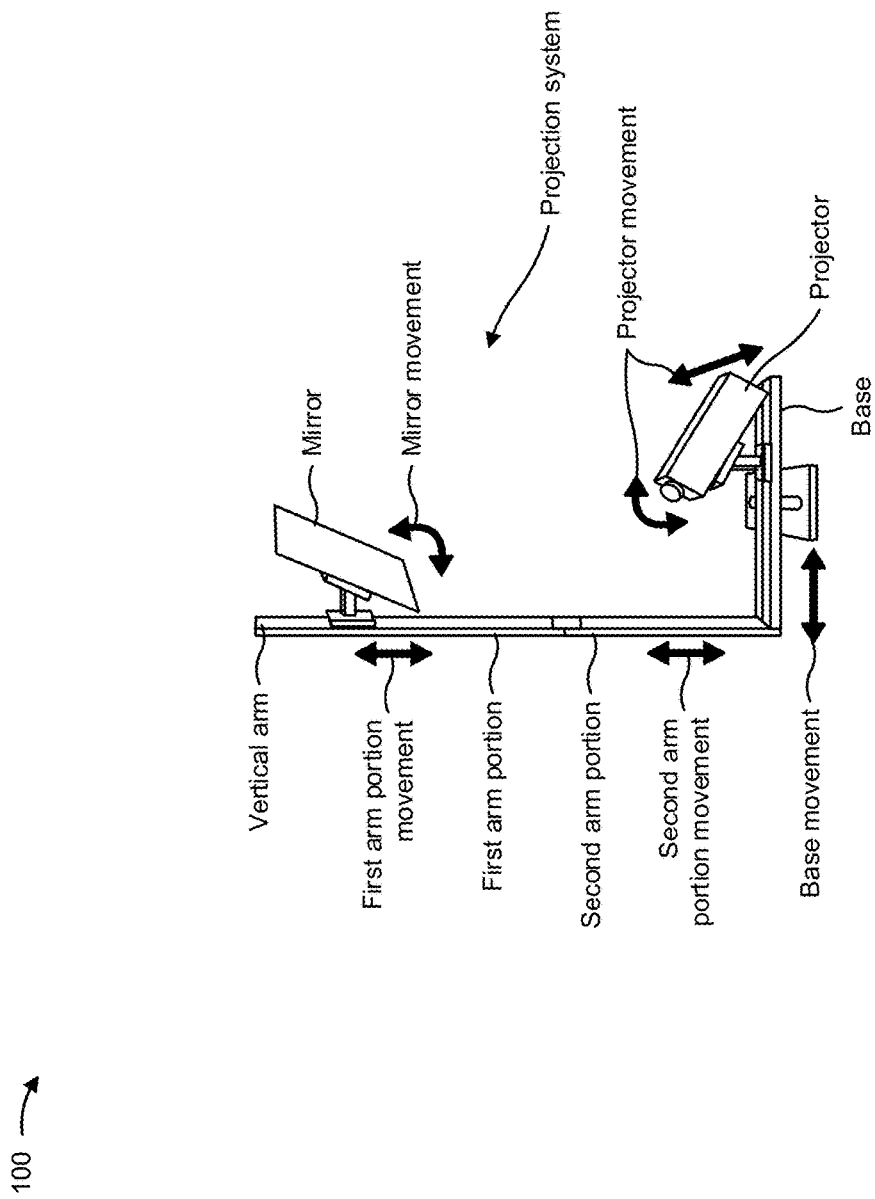

FIGS. 1A-1K are diagrams of an example implementation 100 described herein. As shown in FIG. 1A, a projection system may be provided internally within a mannequin, and the projection system and the mannequin may be associated with and communicate with a control device and a configuration platform. In some implementations, the configuration platform may be omitted, and the control device may perform the functions of the configuration platform. In some implementations, the control device may be provided internally within the mannequin and/or incorporated into the projection system.

As further shown in FIG. 1A, the projection system may include a projector, a mirror, and other devices. The other devices may include, for example, one or more of a mirror position sensor for sensing positions of the mirror, motors for positioning the projector and the mirror, a camera for tracking a user (e.g., a customer) associated with the mannequin, a capacitive sensor and/or an infrared (IR) emitter/sensor for tracking user interaction with the mannequin, a radio-frequency identification (RFID) sensor for tracking clothing displayed by the mannequin, and/or the like.

In some implementations, the configuration platform may be associated with an entity (e.g., a manufacturer of clothing, a distributor of clothing, a seller of clothing, and/or the like) that wishes to highlight a portion of an article of clothing to be displayed by the mannequin, wishes to display a message on the clothing, wishes to display a video on the clothing, and/or the like. In some implementations, the entity may utilize the configuration platform to provide, to the control device, information associated with the clothing, and instructions for displaying the information in relation to the mannequin and the clothing. As further shown in FIG. 1A, and by reference number 105, the control device may receive information to be projected from within and onto the mannequin, and instructions associated with the information (e.g., instructions for displaying the information in relation to the mannequin).

In some implementations, the configuration platform and/or the control device may utilize a model to determine the information to be projected from within and onto the mannequin. In some implementations, the model may include a machine learning model that determines the information to be projected from within and onto the mannequin, a timing of projecting the information, a location on the mannequin on which to project the information, and/or the like.

In some implementations, the configuration platform and/or the control device may perform a training operation, on the machine learning model, with historical mannequin display information (e.g., historical information that has been displayed on mannequins). For example, the configuration platform and/or the control device may separate the historical mannequin display information into a training set, a validation set, a test set, and/or the like. In some implementations, the configuration platform may train the machine learning model using, for example, an unsupervised training procedure and based on the training set of the historical mannequin display information. For example, the configuration platform and/or the control device may perform dimensionality reduction to reduce the historical mannequin display information to a minimum feature set, thereby reducing resources (e.g., processing resources, memory resources, and/or the like) to train the machine learning model, and may apply a classification technique, to the minimum feature set.

In some implementations, the configuration platform and/or the control device may use a logistic regression classification technique to determine a categorical outcome (e.g., that the historical mannequin display information receives particular customer reactions). Additionally, or alternatively, the configuration platform and/or the control device may use a naïve Bayesian classifier technique. In this case, the configuration platform and/or the control device may perform binary recursive partitioning to split the historical mannequin display information into partitions and/or branches, and use the partitions and/or branches to perform predictions (e.g., that the historical mannequin display information receives particular customer reactions). Based on using recursive partitioning, the configuration platform and/or the control device may reduce utilization of computing resources relative to manual, linear sorting and analysis of data points, thereby enabling use of thousands, millions, or billions of data points to train the machine learning model, which may result in a more accurate model than using fewer data points.

Additionally, or alternatively, the configuration platform and/or the control device may use a support vector machine (SVM) classifier technique to generate a non-linear boundary between data points in the training set. In this case, the non-linear boundary is used to classify test data into a particular class.

Additionally, or alternatively, the configuration platform and/or the control device may train the machine learning model using a supervised training procedure that includes receiving input to the machine learning model from a subject matter expert, which may reduce an amount of time, an amount of processing resources, and/or the like to train the machine learning model of activity automatability relative to an unsupervised training procedure. In some implementations, the configuration platform and/or the control device may use one or more other model training techniques, such as a neural network technique, a latent semantic indexing technique, and/or the like. For example, the configuration platform and/or the control device may perform an artificial neural network processing technique (e.g., using a two-layer feedforward neural network architecture, a three-layer feedforward neural network architecture, and/or the like) to perform pattern recognition with regard to optimal regions of the historical mannequin display information. In this case, using the artificial neural network processing technique may improve an accuracy of the trained machine learning model generated by the configuration platform and/or the control device by being more robust to noisy, imprecise, or incomplete data, and by enabling the configuration platform and/or the control device to detect patterns and/or trends undetectable to human analysts or systems using less complex techniques.

As shown in FIG. 1B, the projection system may include a base connected to a vertical arm that includes a first arm portion and a second arm portion. The projector may connect to the base, and the mirror may connect to the first arm portion. As further shown in FIG. 1B, the projector may be positioned or moved along the base in directions indicated by a base movement arrow. The projector may also be positioned or rotated in directions indicated by projector movement arrows. The mirror may be positioned or moved along the first arm portion in directions indicated by a first arm portion movement arrow, and may be further positioned or moved in directions indicated by a second arm portion movement arrow. As further shown in FIG. 1B, the mirror may be positioned or rotated in directions indicated by a mirror movement arrow. In some implementations, the multiple positioning of the projector and/or the mirror may enable the projection system to display information at a variety of portions of the mannequin and at a corresponding variety of portions of clothing or other objects displayed by the mannequin.

Figure 1C:
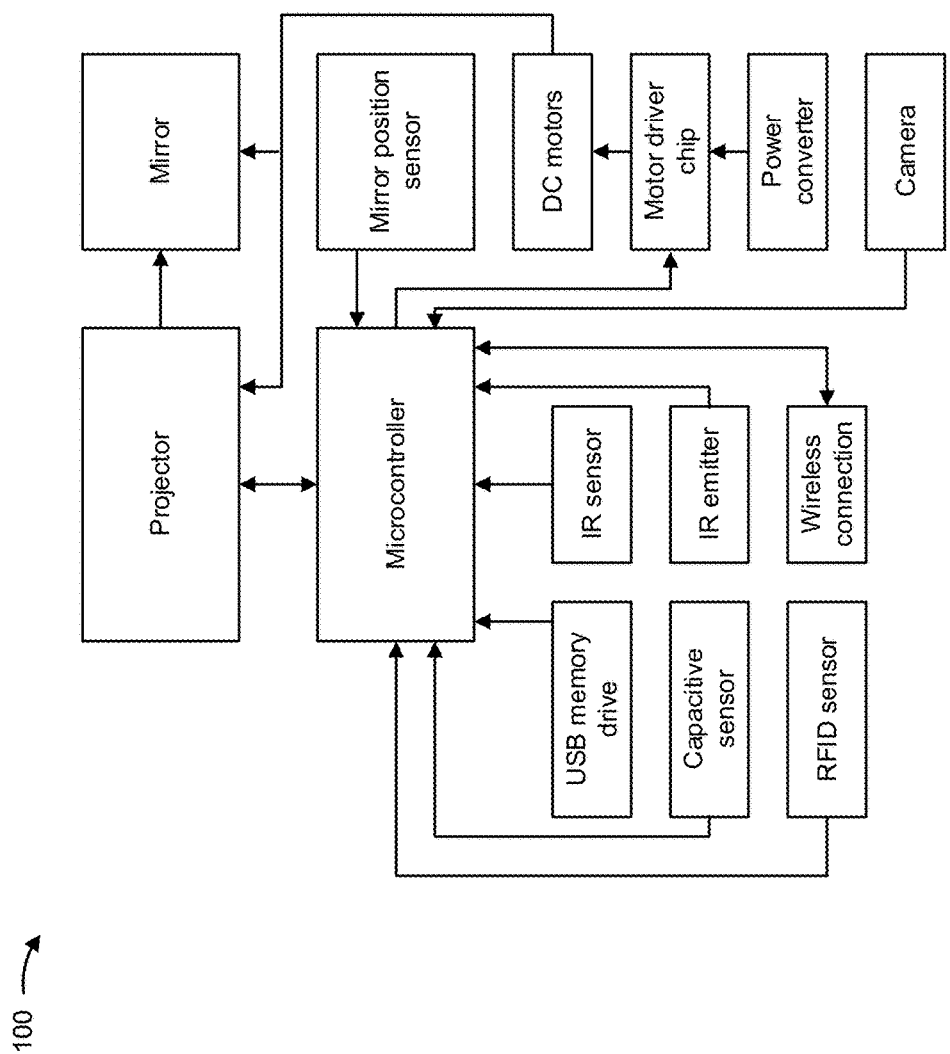

As shown in FIG. 1C, the projection system may include the projector, the mirror, and the other devices. The other devices may include a microcontroller to control operation of the components of the projection system, and a mirror position sensor to determine a position of the mirror. The other devices may include direct current (DC) motors to position the projector and the mirror, a motor driver chip to control the DC motors, and a power converter to convert alternating current (AC) power to direct current (DC) power for provision to the DC motors. The other devices may include a camera to detect a user (e.g., track eyes of the user, track movement of the user, track interactions of the user with the mannequin, identify characteristics of the user (e.g., an age, a height, a weight, and/or the like of the user), and/or the like) interacting with the mannequin, a microphone to record what the user says in the presence of the mannequin, and/or the like. The other devices may include a universal serial bus (USB) memory drive, a capacitive sensor for tracking user interaction with the mannequin, and a RFID sensor for tracking clothing associated with the mannequin. The other devices may include an IR sensor and IR emitter for tracking user interaction with the mannequin, a wireless connection device, and/or the like. In some implementations, one or more of the other devices (e.g., the microcontroller, the USB memory drive, the wireless connection, and/or the like) may be provided within the control device. In some implementations, the control device and the projection system may be provided within the mannequin to conceal the control device and the projection system from a customer viewing merchandise displayed by the mannequin.

As shown in FIG. 1D, and by reference number 110, the control device may position the mirror based on the instructions. In some implementations, the control device may cause the mirror to be moved along the vertical arm (e.g., from a first location to a second location) in a direction indicated by the first arm portion movement arrow, as shown in FIG. 1C. In some implementations, the control device may cause the mirror to be moved along the vertical arm (e.g., from the first location to the second location) in a direction indicated by the second arm portion movement arrow, as shown in FIG. 1C. In some implementations, the control device may cause the mirror to be rotated (e.g., from a first position to a second position) in a direction indicated by the mirror movement arrow, as shown in FIG. 1C. In some implementations, the control device may cause the mirror to be moved along the vertical arm and rotated in relation to the vertical arm.

Figure 1E:
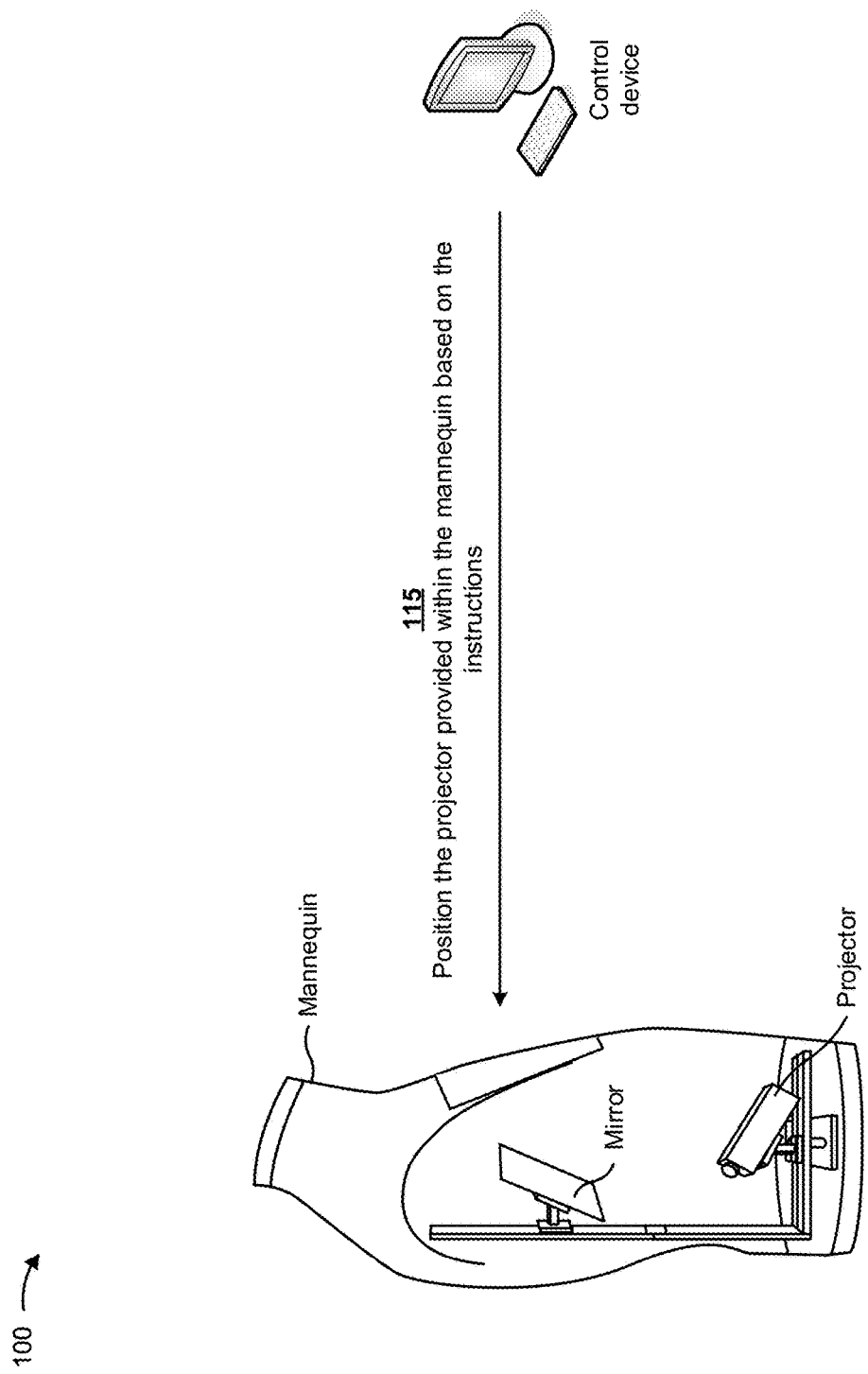

As shown in FIG. 1E, and by reference number 115, the control device may position the projector based on the instructions. In some implementations, the control device may cause the projector to be moved along the base (e.g., from a first location to a second location) in a direction indicated by the base movement arrow, as shown in FIG. 1C. In some implementations, the control device may cause the projector to be rotated (e.g., from a first position to a second position) in a direction indicated by the projector movement arrows, as shown in FIG. 1C. In some implementations, the control device may cause the projector to be moved along the base and rotated in relation to the base.

Figure 1F:
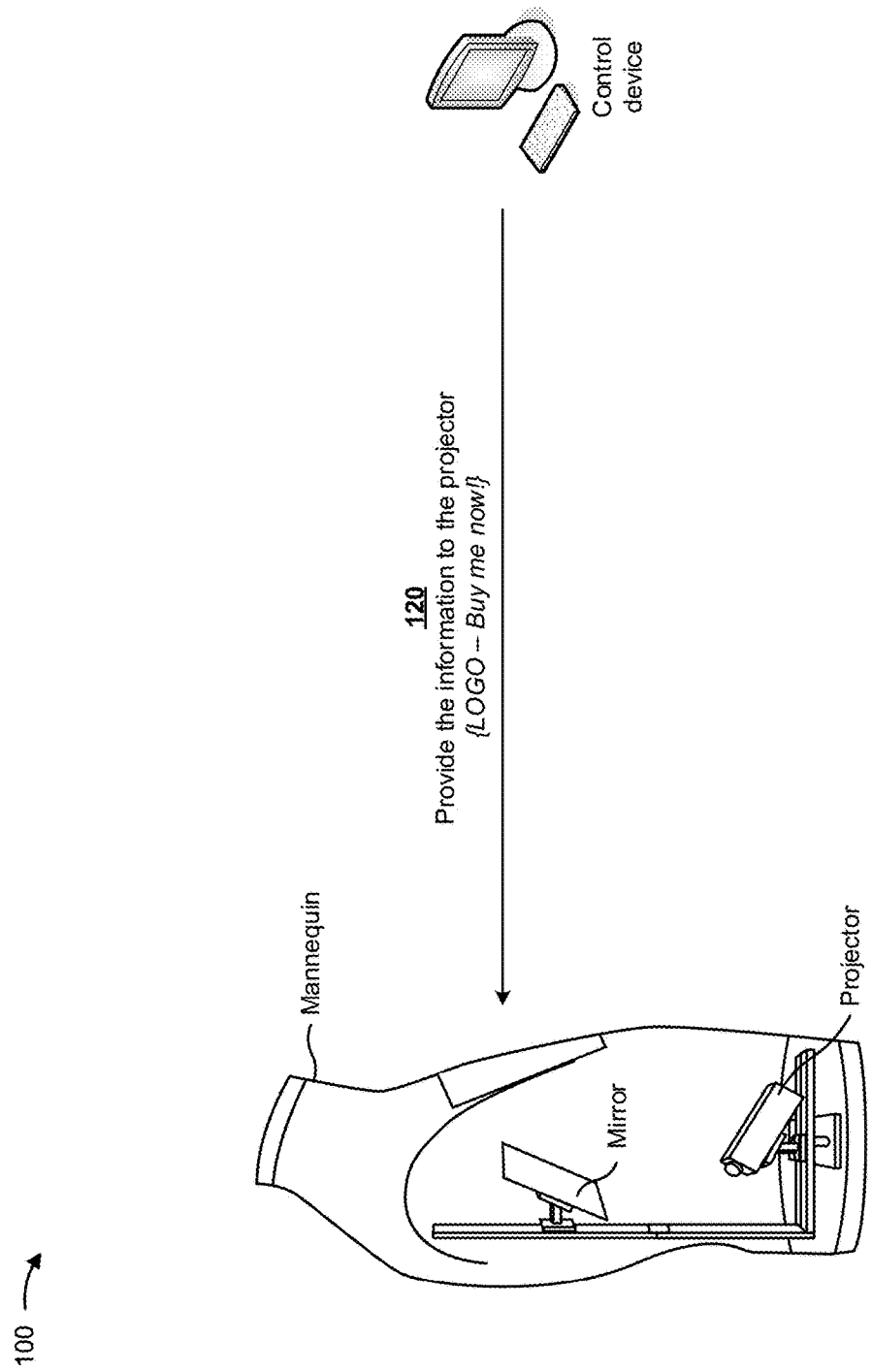

As shown in FIG. 1F, and by reference number 120, the control device may provide, to the projector, the information to be projected from within and onto the mannequin. For example, the information may include a logo for an article of clothing provided on the mannequin and other information (e.g., "LOGO—Buy me now!"). In some implementations, the information may include animations around patterns, pockets, and/or the like of clothing being displayed on the mannequin. In such implementations, projecting from inside of the mannequin allows the projection system and/or the control device to provide for unique animations centered about features of an article of clothing. Such implementations may accentuate features of the clothing, increase brand awareness of the clothing, provide a more vivid user experience, and/or the like.

In some implementations, the information may include logos on an article of clothing and/or animation of a chest logo on an article of clothing displayed on the mannequin. For example, brand specific embroidery logos can be brought to life with projected details or motion provided by the projection system and/or the control device. Such implementations may increase brand awareness of the clothing, may enable a user to provide different logos on the clothing, and/or the like.

In some implementations, the information may include multiple slogans and/or designs on an article of clothing displayed on the mannequin. For example, lines of slogan centric apparel can be actively displayed on the mannequin by rotating between styles in a projected animation provided by the projection system and/or the control device. Such implementations may provide advertising (e.g., a slogan) associated with the clothing, may provide different styles to the clothing, may increase brand awareness of the clothing, and/or the like.

As shown in FIG. 1G, and by reference number 125, the control device may cause the projector to provide the information at a location on the mannequin via the mirror. In some implementations, the control device may cause the projector to project the information towards the mirror, and the mirror may reflect the information towards an internal portion of the mannequin. The information may be displayed or illuminated on the portion of the mannequin, and may be observed on an outer surface of the mannequin (e.g., when the mannequin includes one or more translucent portions). For example, as further shown in FIG. 1G, the control device may cause the projector to project "LOGO—Buy me now!" on an article of clothing (e.g., a yellow shirt) being displayed on the mannequin.

Figure 1H:
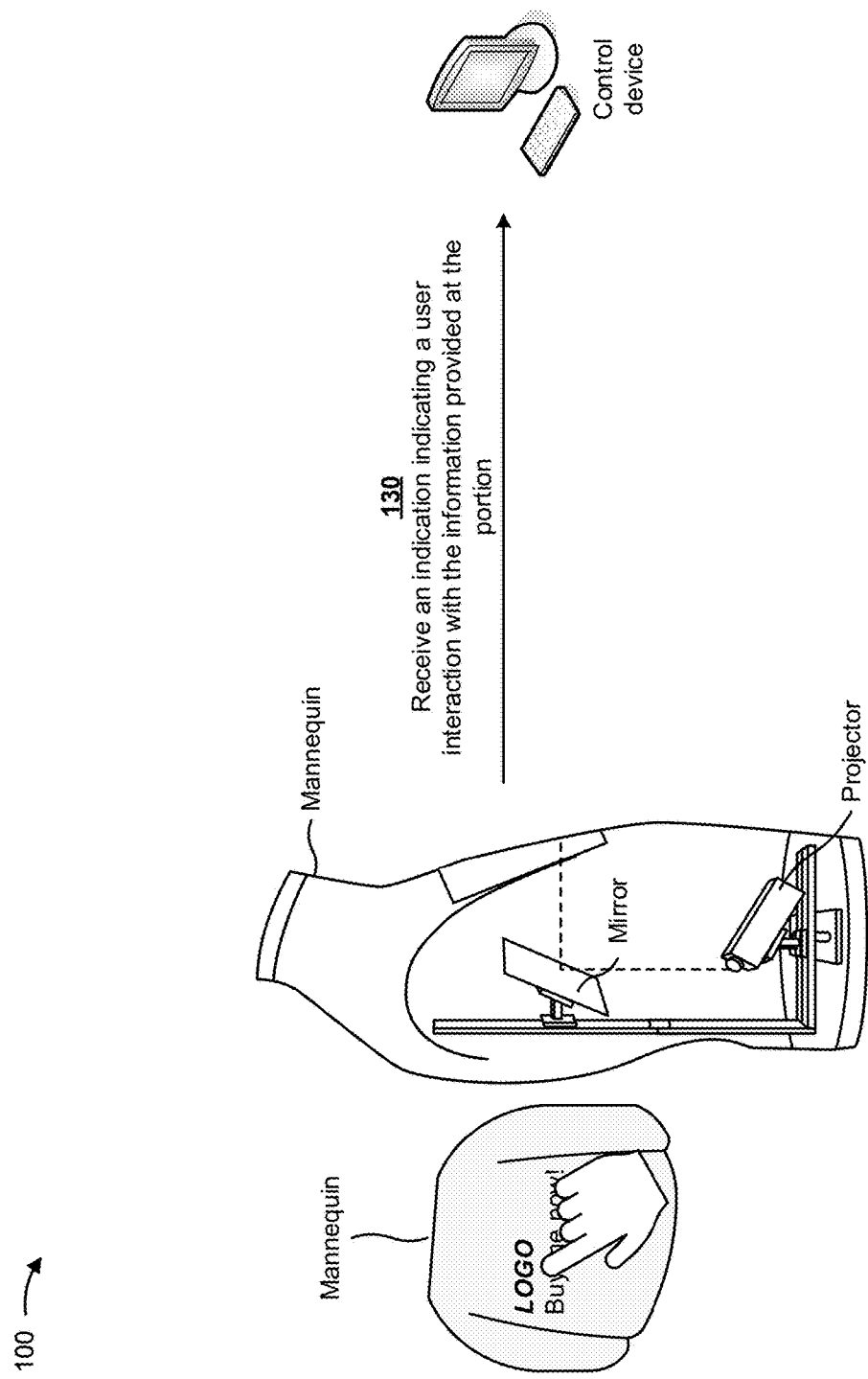

As shown in FIG. 1H, in some implementations, a user (e.g., a customer in a store) may interact with the information displayed on the clothing, and the capacitive sensor and/or the IR emitter/sensor of the projection system may receive an indication indicating that the user interacted with the information. In some implementations, the capacitive sensor and/or the IR emitter/sensor of the projection system may provide, to the control device, the indication indicating the user interaction with the information. As further shown in FIG. 1H, and by reference number 130, the control device may receive the indication indicating the user interaction with the information.

As shown in FIG. 1I, and by reference number 135, the control device may reposition the mirror and the projector based on the indication. In some implementations, the control device may cause the mirror to be moved along the vertical arm (e.g., from the second location to a third location) in a direction indicated by the first arm portion movement arrow, as shown in FIG. 1C. In some implementations, the control device may cause the mirror to be moved along the vertical arm (e.g., from the second location to the third location) in a direction indicated by the second arm portion movement arrow, as shown in FIG. 1C. In some implementations, the control device may cause the mirror to be rotated (e.g., from the second position to a third position) in a direction indicated by the mirror movement arrow, as shown in FIG. 1C. In some implementations, the control device may cause the mirror to be moved along the vertical arm and rotated in relation to the vertical arm.

In some implementations, the control device may cause the projector to be moved along the base (e.g., from the second location to a third location) in a direction indicated by the base movement arrow, as shown in FIG. 1C. In some implementations, the control device may cause the projector to be rotated (e.g., from the second position to a third position) in a direction indicated by the projector movement arrows, as shown in FIG. 1C. In some implementations, the control device may cause the projector to be moved along the base and rotated in relation to the base.

Figure 1J:
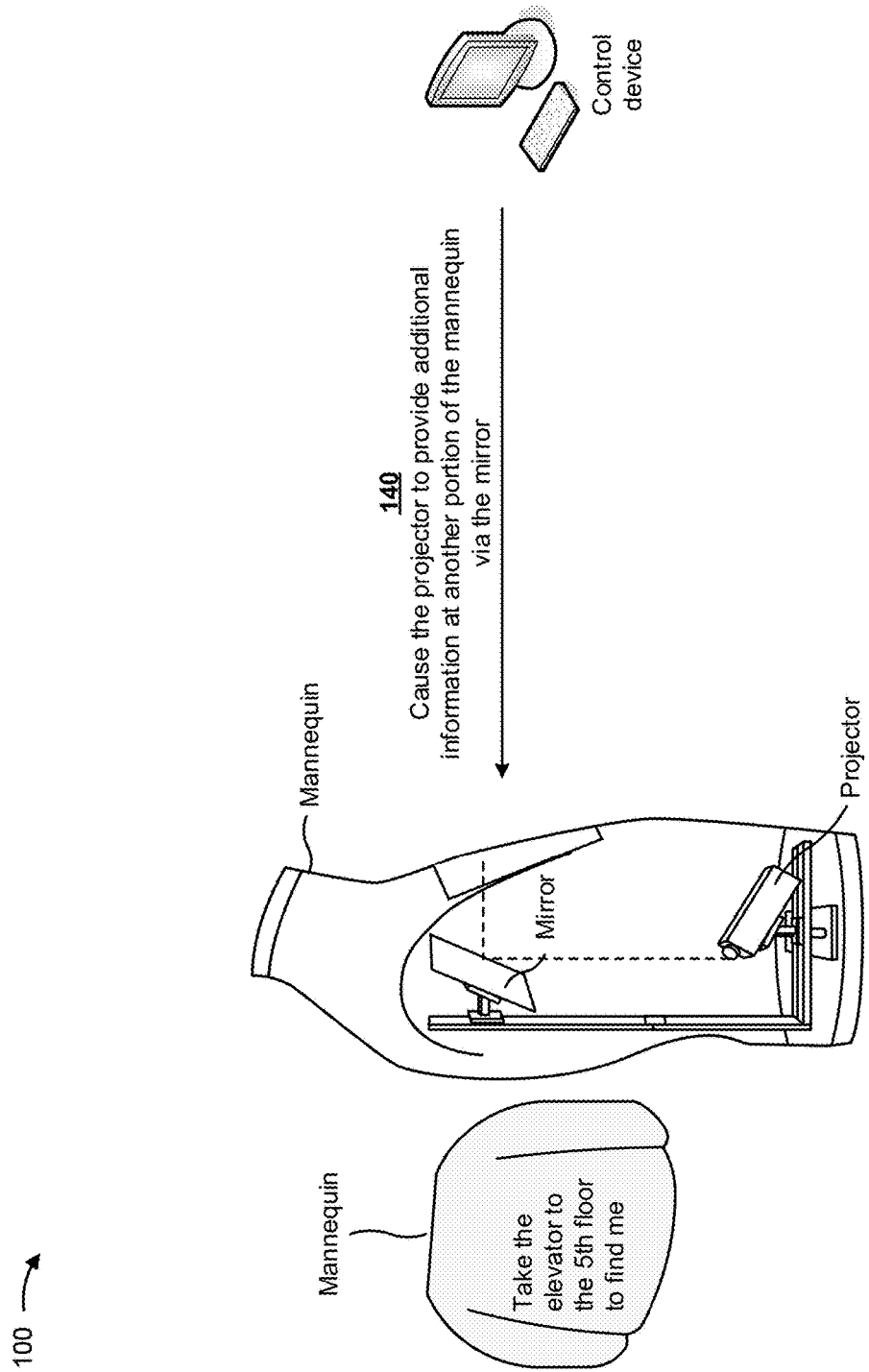

As shown in FIG. 1J, and by reference number 140, the control device may cause the projector to provide additional information at another location on the mannequin via the mirror. The additional information (e.g., "Take the elevator to the 5th floor to find me") may be displayed or illuminated on another portion of the clothing associated with the other location on the mannequin. For example, assume that the projector provides a message (e.g., "Tap here to see other features") on a pocket of a shirt, and that the user taps the message. In response to the user tapping the message, the projector can illuminate stripes of the shirt so that the user can readily view the stripes.

Figure 1K:
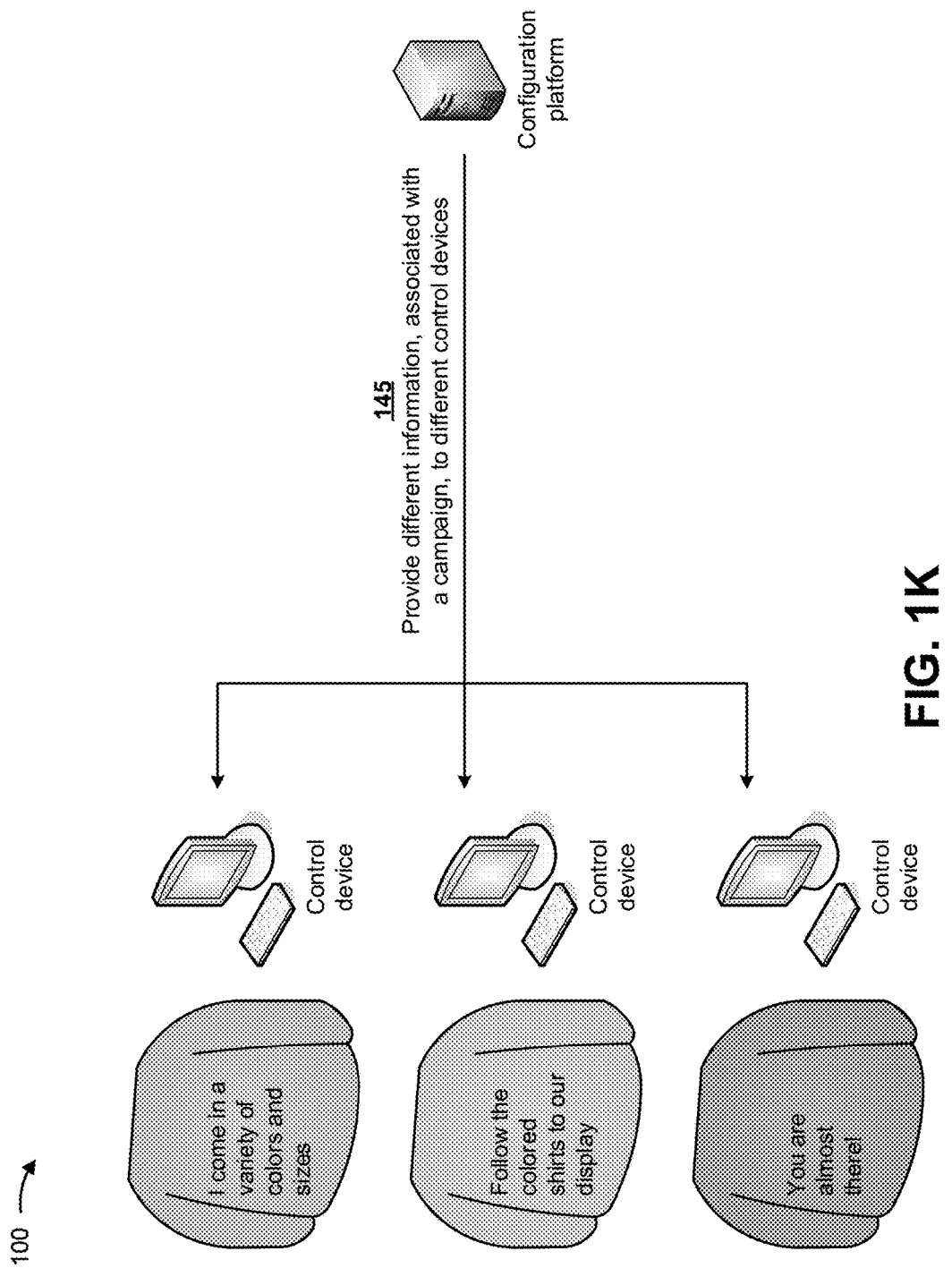

As shown in FIG. 1K, and by reference number 145, the configuration platform may provide different information, associated with a campaign, to different control devices (e.g., or to a single control device associated with multiple mannequins) associated with different mannequins. The control devices may cause the different information to be displayed by the different mannequins. For example, if the campaign is associated with shirts that come in a variety of colors and sizes, the different information may indicate that the shirts come in a variety of colors and sizes and may provide waypoints to a location in a store where the shirts may be purchased.

Although FIGS. 1A-1K depict an example implementation of the projection system and the control device, the projection system and/or the control device may perform additional functions. For example, in some implementations, the camera of the projection system may receive information indicating characteristics (e.g., an age, a height, a weight, and/or the like) associated with a customer interacting with an article of clothing provided on the mannequin. The control device may utilize the characteristics to determine information to project on the mannequin, such as a color, a pattern, a logo, and/or the like. For example, if the customer is a young person, the control device (e.g., via the machine learning model) may determine that brighter colors should be projected on the mannequin since a young person may like brighter colors. In some implementations, the machine learning model may receive information indicating characteristics of the customer, and may predict which information is best for the customer.

In some implementations, the IR sensor of the projection system may provide infrared sensing of user interaction with an article of clothing displayed on the mannequin, and the user interaction may be utilized to activate features of the clothing. For example, the user interaction may cause the projection system and/or the control device to activate animations of a zipper or a button of the clothing. In another example, unzipping the clothing may cause the projection system and/or the control device to reveal a message underneath the clothing. In still another example, the projection system and/or the control device may project a zipper or buttons on the clothing and may project unzipping or unbuttoning the zipper or the buttons when a user moves her hand in a direction or a location of the zipper or the buttons (e.g., as the user moves her hand from the position of the zipper and downward, the projection system and/or the control device may simulate unzipping, or the same for zipping). Such implementations may provide a virtual reality experience for the user without the user having to wear virtual reality gear, may enable the user to interact with features of the clothing, may provide are more vivid user experience, and/or the like.

In some implementations, the RFID sensor of the projection system may be utilized to change patterns and/or animations provided by the projection system and/or the control device on an article of clothing displayed on the mannequin. For example, if a user associated with the mannequin places a specific scarf or hat on the mannequin, the projection system and/or the control device may project a particular pattern or animation on the clothing that matches the scarf or the hat. Such implementations may enable different styles to be suggested to the user, may enable the user to see what styles match other clothing, and/or the like.

In some implementations, the projection system and/or the control device may provide product details (e.g., for wearable devices) associated with a product displayed on the mannequin. For example, the projection system and/or the control device may provide a projection, around a wearable device, that includes device information and/or specifications provided in real time as upgrades occur or as active campaigns from online sources develop. Such implementations may highlight features of the wearable device, may increase brand awareness of the wearable device, and/or the like.

In some implementations, the projection system and/or the control device may provide clothing dimensions (e.g., "large, 28 inches at the waist") for clothing displayed on the mannequin. For example, the projection system and/or the control device may incorporate size specifications of a customer to the clothing displayed on the mannequin. Such implementations may enable the customer to see how appropriately fitted clothing would look on the customer, how different sized clothing would look on the customer, and/or the like.

In some implementations, multiple projection systems, control devices, and mannequins may be utilized to provide directions to customers and/or way-finding to specific products displayed on the mannequins. For example, multiple projection systems, control devices, and mannequins may be used to lead customers from one place to another place in a store or to direct customers to a particular item (e.g., "Find me on the second floor of the store"). Such implementations may direct customers to correct locations for the products displayed on the mannequins so that the customers may quickly locate and purchase the products, may provide for orderly foot traffic in a store, may provide directions to a customer's smart phone (e.g., turn by turn walking directions), may provide a near field communication broadcast to nearby devices (e.g., to preclude having to identify a customer and/or the customer's smart phone), and/or the like.

In some implementations, the projection system and/or the control device may be used to highlight material information associated with an article of clothing displayed on the mannequin. For example, the projection system and/or the control device may provide reduced or expanded views of fabrics associated with specific areas of the clothing. Such implementations may enable fabrics of the clothing to be accentuated, which may encourage purchase of the clothing, and/or the like.

In some implementations, the projection system, the control device, and the configuration platform may be utilized to provide regional merchandising or marketing objectives. For example, the projection system and/or the control device may communicate with the configuration platform in order to provide messages to in-store retail employees from corporate retail headquarters, including but not limited to instructions for providing correct outfits and styles on mannequins. Such implementations may enable the in-store retail employees to dress mannequins with outfits desired by the corporate retail headquarters, may ensure that the desired outfits are appropriately displayed on the mannequins, and/or the like.

In some implementations, the projection system and/or the control device may provide a mock up name and/or number on a sports jersey displayed on the mannequin. For example, the projection system and/or the control device may provide athletic apparel in-store customization options to instantly display a sports star name or a personal name on athletic apparel. In such an example, a keyboard or touchscreen display may be available to permit the user to interact with the projection system and/or the control device, a downloadable application may be available to permit the user to interact with the projection system and/or the control device via the user's smart phone, and/or the like. Such implementations may enable a user to create custom athletic apparel that may be viewed before being purchased, and/or the like.

In some implementations, the projection system and/or the control device may provide mock up embroidery or other personalization on an article of clothing displayed on the mannequin. For example, the projection system and/or the control device may provide custom printing or embroidering on the clothing, and may show exact dimensions of the custom printing or embroidering. Such implementations may enable a user to create clothing with custom printing or embroidering that may be viewed before being purchased, may conserve resources of clothing manufacturing equipment that would otherwise be wasted in remaking clothing that a customer does not like, and/or the like.

In some implementations, the projection system and/or the control device may enable connected and/or crowd sourced designs to be created via an article of clothing displayed on the mannequin. For example, the projection system and/or the control device may enable customers to input T-shirt designs or other various crowd-voted images that could be translated to clothing displayed on the mannequin in real time and voted on. Such implementations may increase brand awareness for the clothing, may advertise the clothing to members of the crowd, may increase the likelihood of purchase of the clothing, and/or the like.

In some implementations, the projection system and/or the control device may enable tattoo placement and size to be displayed on the mannequin. For example, a customer, via the projection system and/or the control device, may provide a tattoo design to specific areas on the mannequin, may change a size of the tattoo, may rotate the tattoo, may move the tattoo to a different area, may execute an aging simulation on the tattoo, and/or the like. Such implementations may encourage the customer to purchase a tattoo, may enable the customer to customize the tattoo, may enable the customer to view the tattoo before purchasing the tattoo, may conserve resources that would be wasted trying to undo or redo an incorrect tattoo, and/or the like.

In some implementations, the projection system and/or the control device may aid in surgery preparation and/or medical training. For example, the projection system and/or the control device may be utilized to project information associated with medical situations onto the mannequin, such as pre-surgery visualization and education information. Such implementations may enable surgeons to review a surgery before undergoing the actual surgery, may provide valuable education to medical students, and/or the like.

In some implementations, the projection system may be automatically calibrated and adjusted via the motors. For example, the motors of the projection system may be used to adjust and calibrate the projector and the mirror to a variety of orientations and locations within the mannequin. Such implementations may enable the projection system to display information at multiple locations of the mannequin, may enable multiple portions of clothing displayed on the mannequin to be highlighted by the projection system and/or the control device, and/or the like.

In some implementations, the camera or the IR emitter/sensor of the projection system may be utilized to determine a quantity of available space within the mannequin, and to tailor projections to fit the available space. Such implementations may enable the projection system and/or the control device to size projections based on the size of the mannequin.

In some implementations, the projection system, the control device, and a corresponding mannequin may be aware of other projection systems, control devices, and mannequins located nearby. For example, the projection systems, the control devices, and/or the mannequins may be individually tagged, and groups of the projection systems, the control devices, and/or the mannequins may recognize proximities of other projection systems, control devices, and/or mannequins and may alter content accordingly. Such implementations may enable different mannequins to display different information so that the same information is not displayed on different mannequins, may enable a particular vendor to display different information on proximate mannequins (e.g., to convey a story associated with a clothing line), and/or the like.

In some implementations, the projection system and/or the control device may be utilized on an animal mannequin (e.g., to display beef cuts, fish filets, and/or the like). For example, the projection system and/or the control device may provide projections within the animal mannequin to highlight particular cuts of meat, highlight pertinent information in classroom or museum settings (e.g., in a biology class), and/or the like. Such implementations may enable customers to visualize food before purchasing the food, may enable education about animals without the use of real animals, and/or the like.

In some implementations, the projection system and/or the control device may be used for robotic applications. For example, the projection system and/or the control device may provide internal projections within a robotic system that create dynamic visualizations of the robotic system. Such implementations may enable the robotic system to come to life and highlight features of the robotic system, and/or the like.

In some implementations, the projection system may include modular attachments so that multiple mirrors and multiple projectors may be provided with the projection system. Such implementations may enable multiple information to be displayed at different portions of a mannequin, and/or the like.

In some implementations, the projection system and/or the control device may be used to track data points, such as charitable contributions associated with an article of clothing displayed by the mannequin, in an active visual manner. Such implementations may encourage customers to contribute to charitable causes, to purchase the clothing since the clothing is associated with a charitable cause, and/or the like.

In some implementations, the camera of the projection system may be utilized for eye tracking of a customer interacting with the mannequin. For example, by tracking where a customer is looking on an article of clothing displayed by the mannequin, the projection system and/or the control device may collect information associated with favored aspects of the clothing. In some implementations, the camera could connect to the motors of the projection system in order to remove glare associated with a customer's eyes. Such implementations may provide valuable information to sellers of the clothing (e.g., which aspects of the clothing most interest customers), may cause the projection system and/or the control device to highlight the favored aspects of the clothing so that other customers will be inclined to purchase the clothing, and/or the like.

In some implementations, the capacitive sensor of the projection system may track if a customer has touched the mannequin. For example, a network of capacitive sensors may be provided on a surface of the mannequin to track customer touches and to store the information for later analysis. Such implementations may provide valuable information to sellers of the clothing (e.g., which portions of the clothing are touched by customers), may cause the projection system and/or the control device to highlight the touched portions of the clothing so that other customers will be inclined to purchase the clothing, and/or the like.

In this way, several different stages of the process for projecting interactive information from internally within a mannequin are automated, which may remove human subjectivity and waste from the process, and which may improve speed and efficiency of the process and conserve computing resources (e.g., processing resources, memory resources, and/or the like). Furthermore, implementations described herein use a rigorous, computerized process to perform tasks or roles that were not previously performed or were previously performed using subjective human intuition or input. For example, currently there does not exist a technique that projects interactive information from internally within a mannequin. Finally, automating the process for projecting interactive information from internally within a mannequin conserves computing resources (e.g., processing resources, memory resources, and/or the like) that would otherwise be wasted in attempting to calibrate a projection system and project information external to the mannequin.

As indicated above, FIGS. 1A-1K are provided merely as examples. Other examples are possible and may differ from what was described with regard to FIGS. 1A-1K.

Figure 2:
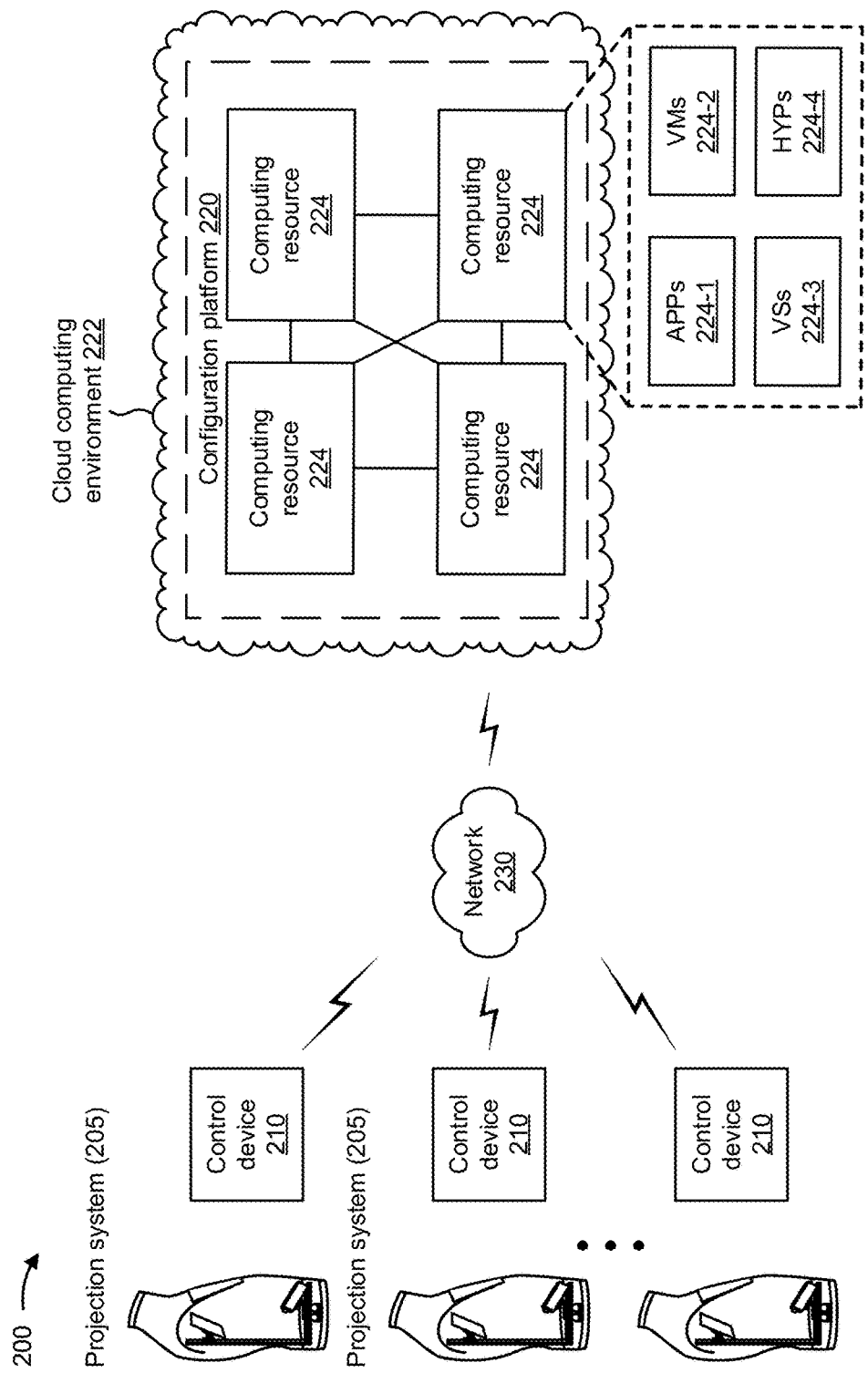
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a projection system 205, a control device 210, a configuration platform 220, and a network 230. Devices of environment 200 may interconnect via wired connections, wireless connections, or a combination of wired and wireless connections.

Projection system 205 includes multiple devices and/or components that enable information (e.g., video, messages, words, images, and/or the like) to be provided on and from within a mannequin, enable portions of clothing worn by the mannequin to be highlighted or accentuated, and/or the like. For example, projection system 205 may include one or more projectors (e.g., image projectors, video projectors, and/or the like), one or more mirrors, a frame for supporting and positioning the projector(s) and mirror(s), one or more mirror position sensors for sensing positions of the mirror(s), one or more motors for positioning the projector(s) and mirror(s), one or more cameras for tracking a user associated with the mannequin, one or more capacitive sensors and/or IR emitters/sensors for tracking user interaction with the mannequin, one or more RFID sensors for tracking clothing displayed by the mannequin, and/or the like.

Control device 210 includes one or more devices capable of receiving, generating, storing, processing, and/or providing information, such as information described herein. For example, control device 210 may receive information from and/or transmit information to projection system 205 and/or configuration platform 220. In some implementations, control device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a Global Positioning Satellite (GPS) device, a server device, a personal computer, or a similar type of device. In some implementations, control device 210 is configured to control multiple projection systems 205. In some implementations, control device 210 is configured to control a single projection system 205. In some implementations, control device 210 is a processor implemented within projection system 205.

Configuration platform 220 includes one or more devices that provide information to control device 210 so that control device 210 can configure projection system 205 to display information on the mannequin. In some implementations, configuration platform 220 may be designed to be modular such that certain software components may be swapped in or out depending on a particular need. As such, configuration platform 220 may be easily and/or quickly reconfigured for different uses. In some implementations, configuration platform 220 may receive information from and/or transmit information to one or more user devices 210.

In some implementations, as shown, configuration platform 220 may be hosted in a cloud computing environment 222. Notably, while implementations described herein describe configuration platform 220 as being hosted in cloud computing environment 222, in some implementations, configuration platform 220 may not be cloud-based (i.e., may be implemented outside of a cloud computing environment) or may be partially cloud-based.

Cloud computing environment 222 includes an environment that hosts configuration platform 220. Cloud computing environment 222 may provide computation, software, data access, storage, etc. services that do not require end-user knowledge of a physical location and configuration of system(s) and/or device(s) that hosts configuration platform 220. As shown, cloud computing environment 222 may include a group of computing resources 224 (referred to collectively as "computing resources 224" and individually as "computing resource 224").

Computing resource 224 includes one or more personal computers, workstation computers, server devices, or other types of computation and/or communication devices. In some implementations, computing resource 224 may host configuration platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by control device 210. Application 224-1 may eliminate a need to install and execute the software applications on control device 210. For example, application 224-1 may include software associated with configuration platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program, and may support a single process. In some implementations, virtual machine 224-2 may execute on behalf of a user (e.g., a user of control device 210 or an operator of configuration platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems, and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
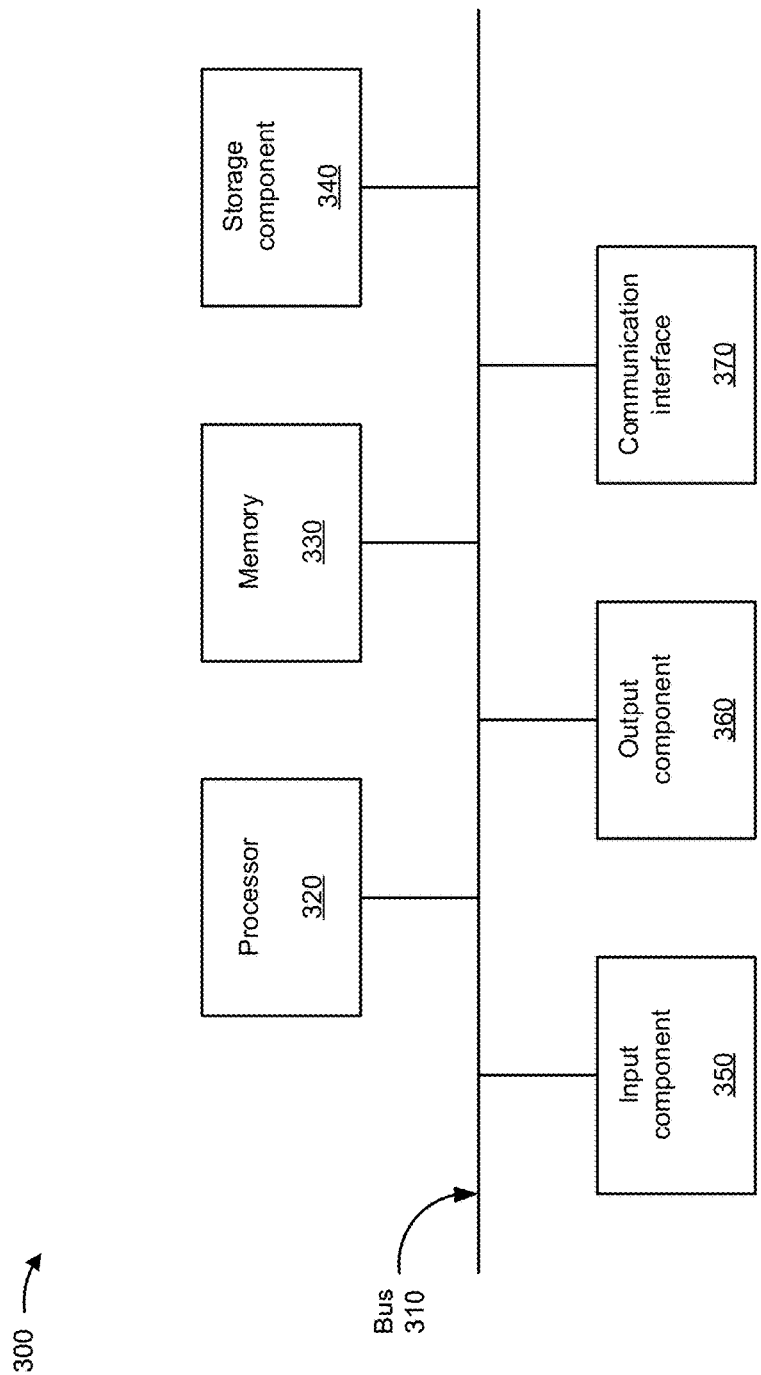
FIG. 3 is a diagram of example components of one or more devices of FIG. 2.

FIG. 3 is a diagram of example components of a device 300. Device 300 may correspond to projection system 205, control device 210, configuration platform 220, and/or computing resource 224. In some implementations, projection system 205, control device 210, configuration platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
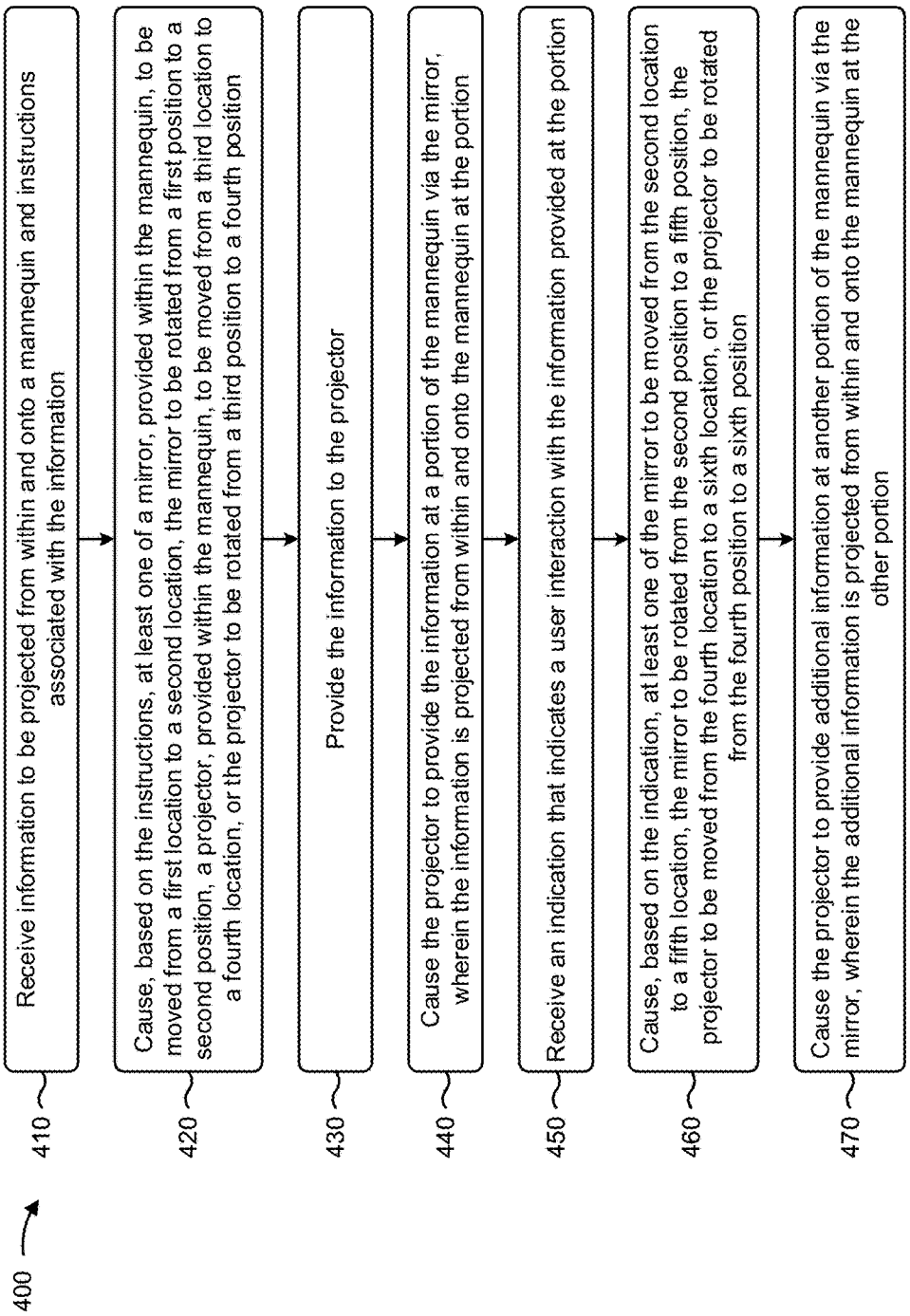

FIG. 4 is a flow chart of an example process 400 for projecting interactive information from internally within a mannequin. In some implementations, one or more process blocks of FIG. 4 may be performed by a control device (e.g., control device 210). In some implementations, one or more process blocks of FIG. 4 may be performed by another device or a group of devices separate from or including the control device, such as a projection system (e.g., projection system 205) and/or a configuration platform (e.g., configuration platform 220).

As shown in FIG. 4, process 400 may include receiving information to be projected from within and onto a mannequin, and instructions associated with the information (block 410). For example, the control device (e.g., using processor 320, communication interface 370, and/or the like) may receive information to be projected from within and onto a mannequin, and instructions associated with the information, as described above in connection with FIGS. 1A-2.

As further shown in FIG. 4, process 400 may include causing, based on the instructions, at least one of a mirror, provided within the mannequin, to be moved from a first location to a second location, the mirror to be rotated from a first position to a second position, a projector, provided within the mannequin, to be moved from a third location to a fourth location, or the projector to be rotated from a third position to a fourth position (block 420). For example, the control device (e.g., using processor 320, memory 330, and/or the like) may cause, based on the instructions, a mirror, provided within the mannequin, to be moved from a first location to a second location, the mirror to be rotated from a first position to a second position, a projector, provided within the mannequin, to be moved from a third location to a fourth location, and/or the projector to be rotated from a third position to a fourth position, as described above in connection with FIGS. 1A-2.

As further shown in FIG. 4, process 400 may include providing the information to the projector (block 430). For example, the control device (e.g., using processor 320, storage component 340, and/or the like) may provide the information to the projector, as described above in connection with FIGS. 1A-2.

As further shown in FIG. 4, process 400 may include causing the projector to provide the information at a portion of the mannequin via the mirror, wherein the information is projected from within and onto the mannequin at the portion (block 440). For example, the control device (e.g., using processor 320, memory 330, storage component 340, and/or the like) may cause the projector to provide the information at a portion of the mannequin via the mirror, as described above in connection with FIGS. 1A-2. In some implementations, the information may be projected from within and onto the mannequin at the portion.

As further shown in FIG. 4, process 400 may include receiving an indication that indicates a user interaction with the information provided at the portion (block 450). For example, the control device (e.g., using processor 320, memory 330, and/or the like) may receive an indication that indicates a user interaction with the information provided at the portion, as described above in connection with FIGS. 1A-2.

As further shown in FIG. 4, process 400 may include causing, based on the indication, at least one of the mirror to be moved from the second location to a fifth location, the mirror to be rotated from the second position to a fifth position, the projector to be moved from the fourth location to a sixth location, or the projector to be rotated from the fourth position to a sixth position (block 460). For example, the control device (e.g., using processor 320, storage component 340, and/or the like) may cause, based on the indication, the mirror to be moved from the second location to a fifth location, the mirror to be rotated from the second position to a fifth position, the projector to be moved from the fourth location to a sixth location, and/or the projector to be rotated from the fourth position to a sixth position, as described above in connection with FIGS. 1A-2.

As further shown in FIG. 4, process 400 may include causing the projector to provide additional information at another portion of the mannequin via the mirror, wherein the additional information is projected from within and onto the mannequin at the other portion (block 470). For example, the control device (e.g., using processor 320, memory 330, and/or the like) may cause the projector to provide additional information at another portion of the mannequin via the mirror, as described above in connection with FIGS. 1A-2. In some implementations, the additional information may be projected from within and onto the mannequin at the other portion.

Process 400 may include additional implementations, such as any single implementation or any combination of implementations described below and/or described with regard to any other process described herein.

In some implementations, the user interaction may include an interaction with a feature of an article of clothing provided on the mannequin, and, when causing the projector to provide the additional information, the control device may cause, based on the interaction with the feature of the article of clothing, the projector to provide an animation associated with the feature of the article of clothing.

In some implementations, the mannequin may include a first article of clothing and the user interaction may include placing a second article of clothing on the mannequin, and, when causing the projector to provide the additional information, the control device may cause the projector to provide a first feature on the first article of clothing based on a second feature of the second article of clothing.

In some implementations, when causing the projector to provide the information at the portion of the mannequin, the control device may cause the projector to provide an animation associated with clothing provided on the mannequin, may cause the projector to provide a logo associated with the clothing provided on the mannequin, may cause the projector to provide a slogan associated with the clothing provided on the mannequin, and/or may cause the projector to provide a design associated with the clothing provided on the mannequin.

In some implementations, the control device may receive, from a camera provided within the mannequin, information indicating characteristics associated with a customer interacting with an article of clothing provided on the mannequin, and may modify the information and/or the additional information based on the information indicating characteristics associated with the customer.

In some implementations, the information may include a name of an article of clothing provided on the mannequin, and the additional information may include clothing dimensions associated with the article of clothing. In some implementations, the control device may receive eye tracking information associated with a customer interacting with an article of clothing provided on the mannequin, and may modify the information and/or the additional information based on the eye tracking information.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

FIG. 5 is a flow chart of an example process 500 for projecting interactive information from internally within a mannequin. In some implementations, one or more process blocks of FIG. 5 may be performed by a control device (e.g., control device 210). In some implementations, one or more process blocks of FIG. 5 may be performed by another device or a group of devices separate from or including the control device, such as a projection system (e.g., projection system 205) and/or a configuration platform (e.g., configuration platform 220).

In some implementations, the control device may perform one or more process blocks of FIG. 5 using, in conjunction with, and/or interacting with, a mirror provided within the mannequin (e.g., as part of the projection system), a projector provided within the mannequin (e.g., as part of the projection system), and/or one or more memories to store information to be projected from within and onto the mannequin and to store instructions associated with the information.

As shown in FIG. 5, process 500 may include causing, based on the instructions, at least one of the mirror to be moved from a first location to a second location, the mirror to be rotated from a first position to a second position, the projector to be moved from a third location to a fourth location, or the projector to be rotated from a third position to a fourth position (block 510). For example, the control device (e.g., using processor 320, memory 330, and/or the like) may cause, based on the instructions, the mirror to be moved from a first location to a second location, the mirror to be rotated from a first position to a second position, the projector to be moved from a third location to a fourth location, and/or the projector to be rotated from a third position to a fourth position, as described above in connection with FIGS. 1A-2.

As further shown in FIG. 5, process 500 may include providing the information to the projector (block 520). For example, the control device (e.g., using processor 320, memory 330, storage component 340, and/or the like) may provide the information to the projector, as described above in connection with FIGS. 1A-2.

As further shown in FIG. 5, process 500 may include causing the projector to project, via the mirror, the information at a portion of the mannequin, wherein the information is projected from within and onto the mannequin at the portion (block 530). For example, the control device (e.g., using processor 320, storage component 340, and/or the like) may cause the projector to project, via the mirror, the information at a portion of the mannequin, as described above in connection with FIGS. 1A-2. In some implementations, the information may be projected from within and onto the mannequin at the portion.

As further shown in FIG. 5, process 500 may include receiving an indication that indicates an interaction with the information provided at the portion (block 540). For example, the control device (e.g., using processor 320, memory 330, storage component 340, and/or the like) may receive an indication that indicates an interaction with the information provided at the portion, as described above in connection with FIGS. 1A-2.

As further shown in FIG. 5, process 500 may include causing, based on the indication, at least one of the mirror to be moved from the second location to a fifth location, the mirror to be rotated from the second position to a fifth position, the projector to be moved from the fourth location to a sixth location, or the projector to be rotated from the fourth position to a sixth position (block 550). For example, the control device (e.g., using processor 320, memory 330, and/or the like) may cause, based on the indication, the mirror to be moved from the second location to a fifth location, the mirror to be rotated from the second position to a fifth position, the projector to be moved from the fourth location to a sixth location, and/or the projector to be rotated from the fourth position to a sixth position, as described above in connection with FIGS. 1A-2.

As further shown in FIG. 5, process 500 may include causing the projector to project, via the mirror, additional information at another portion of the mannequin, wherein the additional information is projected from within and onto the mannequin at the other portion (block 560). For example, the control device (e.g., using processor 320, storage component 340, and/or the like) may cause the projector to project, via the mirror, additional information at another portion of the mannequin, as described above in connection with FIGS. 1A-2. In some implementations, the additional information may be projected from within and onto the mannequin at the other portion.

Process 500 may include additional implementations, such as any single implementation or any combination of implementations described below and/or described with regard to any other process described herein.

In some implementations, the interaction may include an interaction with a feature of an article of clothing provided on the mannequin, and, when causing the projector to project the additional information, the control device may cause the projector to project a reduced view or an expanded view of a fabric associated with the article of clothing. In some implementations, the control device may receive a message indicating particular clothing to provide on the mannequin, and may cause the projector to project the message on the mannequin to enable a person associated with the mannequin to provide the particular clothing on the mannequin.

In some implementations, a sports jersey may be provided on the mannequin, and the control device may receive information indicating a name or a number to project on the sports jersey, and may cause the projector to project the name or the number on the sports jersey to create a custom sports jersey. In some implementations, an article of clothing may be provided on the mannequin, and the control device may receive information indicating custom printing or embroidering to project on the article of clothing, and may cause the projector to project the custom printing or the embroidering on the article of clothing.

In some implementations, the control device may receive, from a camera provided within the mannequin, information indicating characteristics associated with a customer interacting with an article of clothing provided on the mannequin, and may modify the information and/or the additional information based on the information indicating characteristics associated with the customer. In some implementations, the control device may receive eye tracking information associated with a customer interacting with an article of clothing provided on the mannequin, and may modify the information and/or the additional information based on the eye tracking information.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for projecting interactive information from internally within a mannequin. In some implementations, one or more process blocks of FIG. 6 may be performed by a control device (e.g., control device 210). In some implementations, one or more process blocks of FIG. 6 may be performed by another device or a group of devices separate from or including the control device, such as a projection system (e.g., projection system 205) and/or a configuration platform (e.g., configuration platform 220).

As shown in FIG. 6, process 600 may include receiving information to be projected from within and onto a mannequin (block 610). For example, the control device (e.g., using processor 320, communication interface 370, and/or the like) may receive information to be projected from within and onto a mannequin, as described above in connection with FIGS. 1A-2.

As further shown in FIG. 6, process 600 may include receiving instructions associated with projection of the information from within and onto the mannequin, wherein a mirror and a projector are provided within the mannequin, and wherein the projector is in optical communication with the mirror (block 620). For example, the control device (e.g., using processor 320, memory 330, communication interface 370, and/or the like) may receive instructions associated with projection of the information from within and onto the mannequin, wherein a mirror and a projector are provided within the mannequin, and wherein the projector is in optical communication with the mirror, as described above in connection with FIGS. 1A-2.

As further shown in FIG. 6, process 600 may include causing, based on the instructions, at least one of the mirror to be moved from a first location to a second location, the mirror to be rotated from a first position to a second position, the projector to be moved from a third location to a fourth location, or the projector to be rotated from a third position to a fourth position (block 630). For example, the control device (e.g., using processor 320, storage component 340, and/or the like) may cause, based on the instructions, the mirror to be moved from a first location to a second location, the mirror to be rotated from a first position to a second position, the projector to be moved from a third location to a fourth location, and/or the projector to be rotated from a third position to a fourth position, as described above in connection with FIGS. 1A-2.

As further shown in FIG. 6, process 600 may include providing the information to the projector (block 640). For example, the control device (e.g., using processor 320, memory 330, storage component 340, and/or the like) may provide the information to the projector, as described above in connection with FIGS. 1A-2.

As further shown in FIG. 6, process 600 may include causing the projector to provide the information at a portion of the mannequin via the mirror, wherein the information is projected from within and onto the mannequin at the portion (block 650). For example, the control device (e.g., using processor 320, memory 330, and/or the like) may cause the projector to provide the information at a portion of the mannequin via the mirror, as described above in connection with FIGS. 1A-2. In some implementations, the information may be projected from within and onto the mannequin at the portion.

Process 600 may include additional implementations, such as any single implementation or any combination of implementations described below and/or described with regard to any other process described herein.

In some implementations, the control device may receive an indication that indicates a user interaction with the information provided at the portion, may cause, based on the indication, the mirror to be moved from the second location to a fifth location, the mirror to be rotated from the second position to a fifth position, the projector to be moved from the fourth location to a sixth location, and/or the projector to be rotated from the fourth position to a sixth position, and may cause the projector to provide additional information at another portion of the mannequin via the mirror, where the additional information is projected from within and onto the mannequin at the other portion.

In some implementations, the control device may receive, from a camera provided within the mannequin, information indicating characteristics associated with a customer interacting with an article of clothing provided on the mannequin, and may modify the information based on the information indicating characteristics associated with the customer. In some implementations, the control device may receive information associated with another mannequin located a particular distance from the mannequin, and may modify the information projected at the portion of the mannequin based on the information associated with the other mannequin.

In some implementations, the control device may receive, from a sensor provided within the mannequin, sensor information associated with a customer interacting with the mannequin, and may modify the information based on the sensor information. In some implementations, an article of clothing may be provided on the mannequin, and the control device may receive eye tracking information associated with a customer interacting with the article of clothing provided on the mannequin, and may determine information associated with favored aspects of the article of clothing based on the eye tracking information.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

Certain user interfaces have been described herein and/or shown in the figures. A user interface may include a graphical user interface, a non-graphical user interface, a text-based user interface, or the like. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
  receiving, by a device:
    information to be projected from within and onto a mannequin, and
    instructions associated with the information;
  causing, by the device and based on the instructions, at least one of:
    a mirror, provided within the mannequin, to be moved from a first location to a second location,
    the mirror to be rotated from a first position to a second position,
    a projector, provided within the mannequin, to be moved from a third location to a fourth location, or
    the projector to be rotated from a third position to a fourth position;
  providing, by the device, the information to the projector;
  causing, by the device, the projector to provide the information at a portion of the mannequin via the mirror,
    wherein the information is projected from within and onto the mannequin at the portion;
  receiving, by the device, an indication that indicates a user interaction with the information provided at the portion;
  causing, by the device and based on the indication, at least one of:
    the mirror to be moved from the second location to a fifth location, the mirror to be rotated from the second position to a fifth position,
the projector to be moved from the fourth location to a sixth location, or
the projector to be rotated from the fourth position to a sixth position; and
causing, by the device, the projector to provide additional information at another portion of the mannequin via the mirror,
wherein the additional information is projected from within and onto the mannequin at the other portion.

2. The method of claim 1, wherein the user interaction includes an interaction with a feature of an article of clothing provided on the mannequin, and
wherein causing the projector to provide the additional information comprises:
causing, based on the interaction with the feature of the article of clothing, the projector to provide an animation associated with the feature of the article of clothing.

3. The method of claim 1, wherein the mannequin includes a first article of clothing and the user interaction includes placing a second article of clothing on the mannequin, and
wherein causing the projector to provide the additional information comprises:
causing the projector to provide a first feature on the first article of clothing based on a second feature of the second article of clothing.

4. The method of claim 1, wherein causing the projector to provide the information at the portion of the mannequin comprises one or more of:
causing the projector to provide an animation associated with clothing provided on the mannequin,
causing the projector to provide a logo associated with the clothing provided on the mannequin,
causing the projector to provide a slogan associated with the clothing provided on the mannequin, or
causing the projector to provide a design associated with the clothing provided on the mannequin.

5. The method of claim 1, further comprising:
receiving, from a camera provided within the mannequin, information indicating characteristics associated with a customer interacting with an article of clothing provided on the mannequin; and
modifying the information and/or the additional information based on the information indicating characteristics associated with the customer.

6. The method of claim 1, wherein the information includes a name of an article of clothing provided on the mannequin, and
wherein the additional information includes clothing dimensions associated with the article of clothing.

7. The method of claim 1, further comprising:
receiving eye tracking information associated with a customer interacting with an article of clothing provided on the mannequin; and
modifying the information and/or the additional information based on the eye tracking information.

8. A device, comprising:
a mirror provided within a mannequin;
a projector provided within the mannequin;
one or more memories to store:
information to be projected from within and onto the mannequin, and
instructions associated with the information; and
one or more processors, communicatively coupled to the one or more memories, to:
cause, based on the instructions, at least one of:
the mirror to be moved from a first location to a second location,
the mirror to be rotated from a first position to a second position,
the projector to be moved from a third location to a fourth location, or
the projector to be rotated from a third position to a fourth position;
provide the information to the projector;
cause the projector to project, via the mirror, the information at a portion of the mannequin,
wherein the information is projected from within and onto the mannequin at the portion;
receive an indication that indicates an interaction with the information provided at the portion;
cause, based on the indication, at least one of:
the mirror to be moved from the second location to a fifth location,
the mirror to be rotated from the second position to a fifth position,
the projector to be moved from the fourth location to a sixth location, or
the projector to be rotated from the fourth position to a sixth position; and
cause the projector to project, via the mirror, additional information at another portion of the mannequin,
wherein the additional information is projected from within and onto the mannequin at the other portion.

9. The device of claim 8, wherein the interaction includes an interaction with a feature of an article of clothing provided on the mannequin, and
wherein the one or more processors, when causing the projector to project the additional information, are to:
cause the projector to project a reduced view or an expanded view of a fabric associated with the article of clothing.

10. The device of claim 8, wherein the one or more processors are further to:
receive a message indicating particular clothing to provide on the mannequin; and
cause the projector to project the message on the mannequin to enable a person associated with the mannequin to provide the particular clothing on the mannequin.

11. The device of claim 8, wherein a sports jersey is provided on the mannequin, and the one or more processors are further to:
receive information indicating a name or a number to project on the sports jersey; and
cause the projector to project the name or the number on the sports jersey to create a custom sports jersey.

12. The device of claim 8, wherein an article of clothing is provided on the mannequin, and the one or more processors are further to:
receive information indicating custom printing or embroidering to project on the article of clothing; and
cause the projector to project the custom printing or the embroidering on the article of clothing.

13. The device of claim 8, wherein the one or more processors are further to:
receive, from a camera provided within the mannequin, information indicating characteristics associated with a customer interacting with an article of clothing provided on the mannequin; and modify the information and/or the additional information based on the information indicating characteristics associated with the customer.

14. The device of claim 8, wherein the one or more processors are further to:
   receive eye tracking information associated with a customer interacting with an article of clothing provided on the mannequin; and
   modify the information and/or the additional information based on the eye tracking information.

15. A non-transitory computer-readable medium storing instructions, the instructions comprising:
   one or more instructions that, when executed by one or more processors of a device, cause the one or more processors to:
      receive information to be projected from within and onto a mannequin;
      receive instructions associated with projection of the information from within and onto the mannequin,
         wherein a mirror and a projector are provided within the mannequin, and
         wherein the projector is in optical communication with the mirror;
      cause, based on the instructions, at least one of:
         the mirror to be moved from a first location to a second location,
         the mirror to be rotated from a first position to a second position,
         the projector to be moved from a third location to a fourth location, or
         the projector to be rotated from a third position to a fourth position;
      provide the information to the projector;
      receive, from a camera provided within the mannequin, customer information indicating characteristics associated with a customer;
      modify the information based on the customer information indicating characteristics associated with the customer; and
      cause the projector to provide the information at a portion of the mannequin via the mirror,
         wherein the information is projected from within and onto the mannequin at the portion.

16. The non-transitory computer-readable medium of claim 15, wherein the instructions further comprise:
   one or more instructions that, when executed by the one or more processors, cause the one or more processors to:
      receive an indication that indicates a user interaction with the information provided at the portion;
      cause, based on the indication, at least one of:
         the mirror to be moved from the second location to a fifth location,
         the mirror to be rotated from the second position to a fifth position,
         the projector to be moved from the fourth location to a sixth location, or
         the projector to be rotated from the fourth position to a sixth position; and
      cause the projector to provide additional information at another portion of the mannequin via the mirror,
         wherein the additional information is projected from within and onto the mannequin at the other portion.

17. The non-transitory computer-readable medium of claim 15, wherein the customer information indicating characteristics associated with the customer is received while the customer is interacting with an article of clothing provided on the mannequin.

18. The non-transitory computer-readable medium of claim 15, wherein the instructions further comprise:
   one or more instructions that, when executed by the one or more processors, cause the one or more processors to:
      receive information associated with another mannequin located a particular distance from the mannequin; and
      modify the information projected at the portion of the mannequin based on the information associated with the other mannequin.

19. The non-transitory computer-readable medium of claim 15, wherein the instructions further comprise:
   one or more instructions that, when executed by the one or more processors, cause the one or more processors to:
      receive, from a sensor provided within the mannequin, sensor information associated with a customer interacting with the mannequin; and
      modify the information based on the sensor information.

20. The non-transitory computer-readable medium of claim 15, wherein an article of clothing is provided on the mannequin and the instructions further comprise:
   one or more instructions that, when executed by the one or more processors, cause the one or more processors to:
      receive eye tracking information associated with a customer interacting with the article of clothing provided on the mannequin; and
      determine information associated with favored aspects of the article of clothing based on the eye tracking information.

* * * * *